(12) United States Patent
Boding et al.

(10) Patent No.: US 9,129,321 B2
(45) Date of Patent: Sep. 8, 2015

(54) FRAUD DETECTION SYSTEM AUDIT CAPABILITY

(75) Inventors: B. Scott Boding, Mountain View, CA (US); Cory H. Siddens, Mountain View, CA (US)

(73) Assignee: Visa International Service Association, San Francisco, CA (US)

( * ) Notice: Subject to any disclaimer, the term of this patent is extended or adjusted under 35 U.S.C. 154(b) by 52 days.

(21) Appl. No.: 13/451,431

(22) Filed: Apr. 19, 2012

(65) Prior Publication Data

US 2012/0278868 A1 Nov. 1, 2012

Related U.S. Application Data

(60) Provisional application No. 61/481,141, filed on Apr. 29, 2011.

(51) Int. Cl.
| | |
|---|---|
| *G06F 17/30* | (2006.01) |
| *G06F 7/04* | (2006.01) |
| *G06F 15/16* | (2006.01) |
| *G06Q 30/06* | (2012.01) |
| *G06Q 20/12* | (2012.01) |
| *G06Q 20/40* | (2012.01) |

(52) U.S. Cl.
CPC ............... *G06Q 30/06* (2013.01); *G06Q 20/12* (2013.01); *G06Q 20/405* (2013.01); *G06Q 20/4016* (2013.01)

(58) Field of Classification Search
CPC ..................................................... G06Q 30/06
USPC ............................................................ 726/5
See application file for complete search history.

(56) References Cited

U.S. PATENT DOCUMENTS

| | | | |
|---|---|---|---|
| 7,263,506 B2 | 8/2007 | Lee et al. | |
| 7,433,855 B2 | 10/2008 | Gavan et al. | |
| 7,578,438 B2 | 8/2009 | Hogg et al. | |
| 7,657,482 B1 | 2/2010 | Shirey et al. | |
| 8,082,349 B1 * | 12/2011 | Bhargava et al. | 709/227 |
| 2003/0153299 A1 * | 8/2003 | Perfit et al. | 455/410 |
| 2007/0039049 A1 * | 2/2007 | Kupferman et al. | 726/22 |
| 2008/0162396 A1 | 7/2008 | Kerley et al. | |
| 2008/0288382 A1 * | 11/2008 | Smith et al. | 705/35 |
| 2008/0298573 A1 | 12/2008 | Monk | |
| 2008/0313047 A1 * | 12/2008 | Casares et al. | 705/17 |
| 2010/0017328 A1 | 1/2010 | Stephen et al. | |
| 2010/0094765 A1 | 4/2010 | Nandy | |

(Continued)

OTHER PUBLICATIONS

Ashish Vikram;A Solution Architecture for Financial Institutions to Handle Illegal Activities:A Neural Networks Approach ; year 2004; IEEE; pp. 1-10.*

(Continued)

*Primary Examiner* — Monjour Rahim
(74) *Attorney, Agent, or Firm* — Kilpatrick Townsend & Stockton LLP

(57) ABSTRACT

Embodiments of the invention are directed to a fraud detection system that records an audit log of modifications made by a user to a selection of fraud detection rules in a merchant profile. The audit log contains details of the modifications and the user associated with the modifications. A search can be conducted on the audit log to determine details of modifications made to a merchant profile within the fraud detection system.

20 Claims, 19 Drawing Sheets

(56) References Cited

U.S. PATENT DOCUMENTS

| | | | |
|---|---|---|---|
| 2010/0138340 A1* | 6/2010 | Shirey et al. | 705/40 |
| 2010/0312705 A1* | 12/2010 | Caruso et al. | 705/45 |
| 2011/0016041 A1 | 1/2011 | Scragg | |
| 2011/0016052 A1 | 1/2011 | Scragg | |
| 2012/0271743 A1* | 10/2012 | Patel et al. | 705/35 |
| 2013/0024371 A1* | 1/2013 | Hariramani et al. | 705/41 |

OTHER PUBLICATIONS

Non-Final Office Action mailed on Apr. 8, 2013 for U.S. Appl. No. 13/458,910, 9 pages.

Non-Final Office Action mailed on Oct. 22, 2014 for U.S. Appl. No. 13/458,910, 10 pages.

\* cited by examiner

FIG. 11

Audit Log Search

Search Parameters

Date Range — 831
Custom Range
Start April 1 2012 12:00 AM
End April 15 2012 11:59 PM — 840

Category* — 832
Risk

Subcategory — 833

User Name — 834

Keyword — 835

Search — 836

*Required Fields — 837

Audit Log Search

Search Parameters — 830

- Date Range — 831
  - Custom Range
  - Start April 1 2012 12:00 AM — 840
  - End April 15 2012 11:59 PM

- Category* — 832
  - Risk

- Subcategory — 833
  - (dropdown) — 835
    - Profiles
    - Custom Rules
    - Active Profile Selector
    - Passive Profile Selector
    - Custom Lists
    - Queues
    - Velocity
    - Settings
    - Third Party
    - Reviewer Settings
    - DMH Group Activation
    - DMH Group Management
    - List Management

- User Name — 834

- Search — 836

*Required Fields — 837

Profiles

Order Profiles — 1310

| Name 1311 | Description 1312 |
|---|---|
| Example | This profile was generated automatically by Decision Manager. |
| Test profile | |
| ruleTest profile | A\|P- |

1313

[Add Profile With Core Rules] 1314    [Add Empty Profile] 1315    [Delete] 1316

Profile Selectors — 1320

This section shows your profile selector rules, and the profile that will be used to evaluate the orders if the conditions are satisfied. The selector rules appear in the order that Decision Manager uses to evaluate them. If no selector rule is triggered or if none is present, the default profile is used to evaluate the orders.

| | Rule Name 1323 | Rule Description 1324 | Order Profile 1325 |
|---|---|---|---|
| 1 | activeProfileRule1 | rule test string | rule test profile |
| 2 | activeProfileRule2 | rule test string | rule test profile |

Active Selectors 1321    Passive Selectors 1322

3  Select a default profile to evaluate orders that do not trigger an active profile selector rule: [ruleTest profile ▾] 1326

[Add Selector Rule] 1327    [Delete] 1328

Results: Start Date: Apr 1 2012 12:00:00 AM | End Date: Apr 15 2012 09:15:30 AM | Category: Risk | Audit entries: 2

| Description | Date | Subcategory | Merchant ID △ | Organization | User Name | Keyword |
|---|---|---|---|---|---|---|
| Modifying Default Passive Profile: CHANGED Default Passive Profile: ruleTest profile TO Default Passive Profile: Test profile | Apr 10 2012 08:53:41 AM | Passive Profile Selector | merchantID | orgID | user1 | Default Passive Profile |
| Modifying Default Active Profile: CHANGED Default Active Profile: ruleTest profile TO Default Active Profile: Exchange | Apr 10 2012 08:53:37 AM | Active Profile Selector | merchantID | orgID | user1 | Default Active Profile |

FIG. 16

Results: Start Date: Apr 1 2011 05:51:33 PM | End Date: Apr 15 2011 08:17:33 PM | Category: Risk | Audit entries: 2

| Description | Date | Subcategory | Merchant ID ▲ | Organization | User Name | Keyword |
|---|---|---|---|---|---|---|
| Modifying Test profile:<br>CHANGED<br>  JVM Issue: Reject: 1<br>TO<br>  JVM Issue: Review: 1 | Apr 13 2011 06:31:23 PM | PROFILES | merchantID | orgID | user2 | Test profile |
| Modifying JVM Issue:<br>CHANGED<br>  Billing city is not equal to combo2<br>TO<br>  Billing city is equal to Decoded IP city | Apr 13 2011 06:31:22 PM | CUSTOM RULES | merchantID | orgID | user2 | JVM Issue |

FIG. 17

Results: Start Date: Apr 1 2012 12:00:00 AM | End Date: Apr 15 2012 12:00:35 PM | Category: Risk | Audit/entries: 1
Subcategory: Custom Rules

| Description | Date | Subcategory | Merchant ID ▲ | Organization | User Name | Keyword |
|---|---|---|---|---|---|---|
| Adding Cupertino Orders<br>Name: Cupertino Orders<br>Description: Orders shipping to Cupertino<br>Category: Shipping Rules<br>Core Rule: Yes<br>Core Rule Decision: Review<br>Group Rule: No<br>All of:<br>Shipping city contains "Cupertino"<br>Amount (Grand Total) is greater than 500 USD. Applies to orders in all currencies. | Apr 02 2012 11:30:02 PM | Custom Rules | merchantID | orgID | user3 | Cupertino Orders |

FIG. 18

```
Description                    1801                          △
┌─────────────────────────────────────────────────────────┐
│ cvn                           1802                      │
└─────────────────────────────────────────────────────────┘
Adding profile8336:
  Name: profile8336
  Description: profile8336
  Group profile: No
  Priority: 3
  Send orders for review to: Abccd
  Send rejected orders to: Abccd
  Use this model for fraud scoring: Default model
  Rules
     Merchant-specific order velocity: Monitor
     Account issued outside of billing country: Monitor
     AVS service not available: Monitor
     Customer not enrolled in PPN Verification System: Monitor
     No AVS match: Monitor
     Partial AVS match: Monitor
     CVN not submitted: Monitor
     CVN not supported by cardholder's bank: Monitor
     CVN service not available: Monitor
     No CVN match: Monitor
     Suspicious telephone number: Monitor
     Suspiciously high number of account numbers: Monitor
     Suspiciously high number of different e-mail addresses: Monitor
```

FRAUD DETECTION SYSTEM AUDIT CAPABILITY

CROSS-REFERENCES TO RELATED APPLICATIONS

This application is a non-provisional application of and claims the benefit of priority of U.S. Provisional Application No. 61/481,141, filed on Apr. 29, 2011, which is herein incorporated by references in its entirety for all purposes.

BACKGROUND

As conducting transactions over the Internet has become increasingly popular, the problems and challenges that arise for merchants have also increased. Online transactions create greater difficulty in determining which transactions are legitimate and which transactions are fraudulent. Stolen payment data may be used by a fraudster to purchase goods or services from a merchant. The use of stolen payment data may not be immediately detected by the merchant and may not be known until a significant time after the goods or services have been provided to the fraudster. Thus, the resulting fraud can cost the merchant significant amounts of money in the form of lost revenue and lost stock.

Some merchants take it upon themselves to manually review each and every order and expend significant time and resources in order to determine whether transactions are legitimate or fraudulent. As transaction volumes increase, this becomes an increasingly unsustainable model for merchants. As a result, merchants may find it necessary to incorporate an automated fraud detection system into their transaction processing system.

Some fraud detection systems can include fraud detection rules that evaluate transactions and assist merchants in deciding whether a specific transaction should be accepted or rejected.

However, even with sophisticated fraud detection systems in place, a merchant can still be compromised and be responsible for the costs of fraudulent transactions (e.g. the loss of goods and/or the loss of consideration for those goods). For example, a fraud detection rule may have been intentionally or accidentally modified so as to accept transactions that would ordinarily not be accepted or to misidentify transactions that should be rejected. The merchant may have no way of determining when a fraud rule was modified or who may have done the modification.

Further, new and enhanced methods of detecting fraud with greater merchant services have become increasingly necessary to provide greater security and functionality.

Embodiments of the invention address the above problems, and other problems, individually and collectively.

BRIEF SUMMARY

Embodiments of the present invention are directed to systems and methods for processing search parameters through a fraud detection system configured to record and provide an audit log containing modifications to a selection of fraud detection rules and users associated with each modification.

One embodiment of the invention is directed to a method comprising receiving a modification to a selection of fraud detection rules from a client computer operated by a user at a server computer. The modification is recorded in a database by the server computer and the user is associated with the modification. The method may also comprise searching the database, by the server computer, for modifications associated with a first fraud detection rule, and returning a search result based on the modifications to the first fraud detection rule.

Another embodiment of the invention is directed to a server computer comprising a processor and a non-transitory computer-readable storage medium. The computer readable medium comprises code executable by the processor for implementing a method. The method comprises receiving a modification to a selection of fraud detection rules from a client computer operated by a user at the server computer. The modification is recorded in a database by the server computer and the user is associated with the modification. The method may also comprise searching the database, by the server computer, for modifications associated with a first fraud detection rule, and returning a search result based on the modifications to the first fraud detection rule.

Another embodiment of the invention is directed to a method comprising transmitting, by a client computer to a fraud detection system via a communications network, a set of search parameters. The search parameters are transmitted for conducting a search for modifications to a selection of fraud detection rules in a merchant profile in a fraud rules modification database. The method may also comprise receiving, at the client computer, from the fraud detection system, a search result based on the set of search parameters.

Another embodiment of the invention is directed to a client computer comprising a processor and a non-transitory computer-readable storage medium. The computer readable medium comprises code executable by the processor for implementing a method. The method comprises transmitting, by the client computer to a fraud detection system via a communications network, a set of search parameters. The search parameters are transmitted for conducting a search for modifications to a selection of fraud detection rules in a merchant profile in a fraud rules modification database. The method may also comprise receiving, at the client computer from the fraud detection system, a search result based on the set of search parameters These and other embodiments of the invention are described in further detail below with reference to the Figures and the Detailed Description.

BRIEF DESCRIPTION OF THE DRAWINGS

FIG. 11 shows a depiction of features of a customizable date range search parameter on an audit log search page according to an embodiment of the invention.

FIG. 12 shows a depiction of a customizable date range search parameter on an audit log search page according to an embodiment of the invention.

FIG. 13 shows a depiction of a customizable subcategory search parameter on an audit log search page according to an embodiment of the invention.

FIG. 14 shows a depiction of a Profile page showing profile settings according to an embodiment of the invention.

FIG. 16 shows a depiction of a resulting audit log search following modifications to profile settings according to an embodiment of the invention.

FIG. 17 shows a depiction of a resulting audit log search following modifications to a fraud rule according to an embodiment of the invention.

FIG. 18 shows a depiction of a resulting audit log search following the addition of a fraud rule according to an embodiment of the invention.

FIG. 19 shows a depiction of an audit log search showing the result of narrowing search results according to an embodiment of the invention.

DETAILED DESCRIPTION

Figure 1:
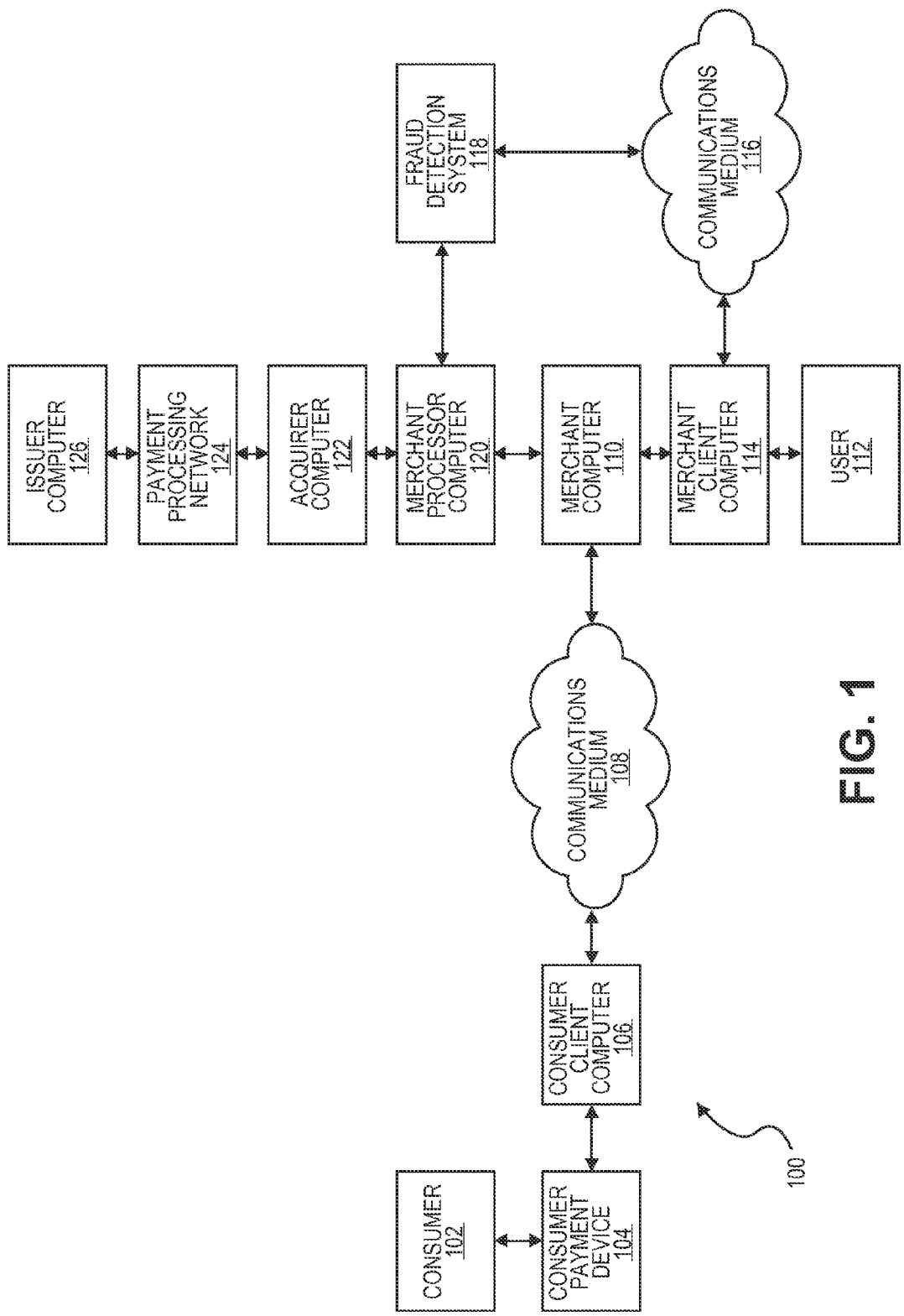
FIG. 1 shows a system diagram of a payment processing system according to an embodiment of the invention.

Prior to discussing embodiments of the invention, some descriptions of some terms may be helpful in understanding embodiments of the invention.

The term "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

The term "client computer" may include any suitable computational apparatus. The client computer may be an apparatus operated by a consumer, a user associated with a merchant, or any other individual. The client computer may use any suitable wired or wireless network, including the Internet, in order to communicate with other systems. For example, a consumer client computer may be used by a consumer to interact with a merchant Internet storefront in order to conduct a transaction. A merchant client computer may be used by a user associated with a merchant to interact with other merchant computer systems and a fraud detection system.

The term "fraud detection system" may include a single computer or a network of suitable processing entities (e.g., computers) that may have the ability to receive, process and evaluate transaction details to provide fraud detection services. The fraud detection system may have or operate at least a server computer and may include a plurality of databases. The fraud detection system may include a selection of fraud detection rules and merchant profiles that can be created, modified, and/or deleted. The fraud detection system may further record an audit log of modifications made to customizable settings, the selection of fraud detection rules, and merchant profiles that reside within the system.

The term "fraud detection rule" may refer to a rule in the fraud detection system, and may include a customizable rule. Each fraud detection rule may allow customization as to name, description, category, status as a core rule, and for further processes or actions to be taken if the fraud detection rule is triggered. Each fraud detection rule may further allow for rule conditions to be established based on a number of criteria.

The term "merchant profile" may include a selection of fraud detection rules and settings established by a merchant with the fraud detection system. A merchant profile may be added, modified or deleted in the fraud detection system. The merchant profile may include customizable settings for name, profile description, and a selection of fraud detection rules. The merchant profile may be associated with one or more users who have access to modify the selection of fraud detection rules contained in the merchant profile.

The term "modification" may include additions, deletions, conversions, or any alterations to a preexisting fraud detection rule. It may also refer to additions, deletions, conversions, or any alternations to a merchant profile. Modification may also refer to the creation of new fraud detection rules or merchant profiles. For example, the modification may be to add or delete a condition within a fraud detection rule, and/or the modification may be to add or delete an entire fraud detection rule within a merchant profile. Modifications may also refer to changes to text fields and setting contained within a fraud detection rule or merchant profile.

The term "database" may include any hardware, software, firmware, or combination of the preceding for storing and facilitating retrieval of information. Also, the database may use any of a variety of data structures, arrangements, and compilations to store and facilitate retrieval of information.

The term "fraud rules modification database" may refer to a database in the fraud detection system that stores information regarding modifications made to settings and/or conditions in fraud detection rules and/or merchant profiles. The fraud rules modification database may further store information regarding the user ID of users that effected the modifications to fraud detection rules and/or merchant profiles.

The term "recording" may include storing information regarding a modification to a fraud detection rule or a merchant profile into a database. Recording may also include storing information as to the user ID of a user who effected the modification to the fraud detection rule and/or merchant profile. The recording may be accomplished by the server computer in the fraud detection system and may be stored in a fraud rules modification database. For example, if a given user modifies a fraud detection rule, the name of the rule being modified, the details of the modification, the date and time of the modification, the user ID logged into the fraud detection system, as well as other pertinent information can be recorded in the fraud rules modification database for future purposes.

The term "user" may refer to an individual or entity who can access the fraud detection system using credentials (e.g. merchant ID, user ID and password) that the individual or entity is authorized to use. As used herein, user may also refer to an individual or entity that is not authorized to access the fraud detection system, but has access to authorized credentials allowing them access to the fraud detection system. The user can access merchant profiles and fraud detection rules and make modifications to merchant profiles and/or fraud detection rules that are then associated with the user ID logged into the fraud detection system and stored in the fraud rules modification database.

The term "search parameters" may refer to constraints for a search. They may include settings and text fields that a user can customize in order to conduct an audit log search of the fraud rules modification database. For example, search parameters may include, but are not limited to, a date range, a category, a subcategory, and user name and keyword fields. The user may conduct a search of the fraud rules modification database once the user has established the search parameters for conducting the search.

The term "search result" may refer to a result of a search for information. It may include information displayed as an output of an audit log search of the fraud rules modification database. The search result may include information as to modifications made to fraud detection rules and/or merchant profiles, as well as the corresponding identification information for the user logged into the system that made the modifications (e.g. merchant ID, organization ID, and user ID). The search result may further include the date of the modification, the subcategory of the fraud detection rule modified, and a keyword, which may indicate the name of the rule or condition modified.

The term "parsing" may refer to any suitable analysis process for analyzing data. In some embodiments, a computer may parse search results presented in an audit log search. For example, the fraud detection system can narrow the outputted search results to include only those modifications made by a specific user. When a user conducts a search, the user may further enter a set of characters (e.g. a user ID, a fraud detection rule, etc.) that is used by the fraud detection system in evaluating the outputted search results. The fraud detection system may then remove any search results that do not include the characters entered.

I. Systems

Example embodiments are typically implemented in the context of a financial transaction. Therefore, prior to further discussing an audit log search capability within a fraud detection system, a brief description of transaction processing will be presented.

An exemplary system 100 for transaction processing can be seen in FIG. 1. The system 100 includes a consumer 102, a consumer payment device 104, a consumer client computer 106, a merchant computer 110, a user 112, a merchant client computer 114, a fraud detection system 118, a merchant processor computer 120, an acquirer computer 122, a payment processing network 124, and an issuer computer 126. In a typical transaction, a consumer 102 may purchase goods or services at a merchant associated with the merchant computer 110 using a consumer payment device 104. The transactions details are then sent to the merchant processor computer 120 and to the acquirer computer 122. The acquirer computer 122 can communicate with an issuer computer 126 via a payment processing network 124 for additional transaction processing. For simplicity of illustration, a certain number of components are shown is shown in FIG. 1. It is understood, however, that embodiments of the invention may include more than one of each component. In addition, some embodiments of the invention may include fewer than all of the components shown in FIG. 1. Also, the components in FIG. 1 may communicate via any suitable communication medium (including the internet), using any suitable communication protocol.

The consumer client computer 106 may communicate with the merchant computer 110 via a communications medium 108, such as a network (e.g. the Internet). Similarly, the merchant client computer 114 may communicate with the fraud detection system 118 via a communications medium 116, such as a network (e.g. the Internet).

The consumer 102 may be an individual, or an organization such as a business, that is capable of purchasing goods or services. The user 112 may be a merchant, an employee of the merchant, or any other individual who has access to the merchant client computer 114.

The consumer payment device 104 may be in any suitable form. For example, suitable consumer payment devices can be hand-held and compact so that it can fit into a consumer's wallet and/or pocket (e.g., pocket-sized). The consumer payment device 104 can include a processor, and memory, input devices, and output devices, operatively coupled to the processor. Specific examples of consumer payment devices include cellular or wireless phones, personal digital assistants (PDAs), pagers, portable computers, smart cards, and the like. The consumer payment devices can also be debit devices (e.g., a debit card), credit devices (e.g., a credit card), or stored value devices (e.g., a pre-paid or stored value card).

The consumer 102 can use the consumer client computer 106, which is communicatively coupled to the merchant computer 110 via the communications medium 108 in order to conduct a transaction with the merchant. The consumer client computer 106 may be in any suitable form. Example of consumer mobile devices include any device capable of accessing the Internet, such as a personal computer, cellular or wireless phones, personal digital assistants (PDAs), tablet PCs, and handheld specialized readers. The consumer client computer 106 transmits data through the communications medium 108 to the merchant computer 110. In some embodiments of the invention, the consumer payment device 106 and the consumer client computer 106 may be a single device.

Figure 2:
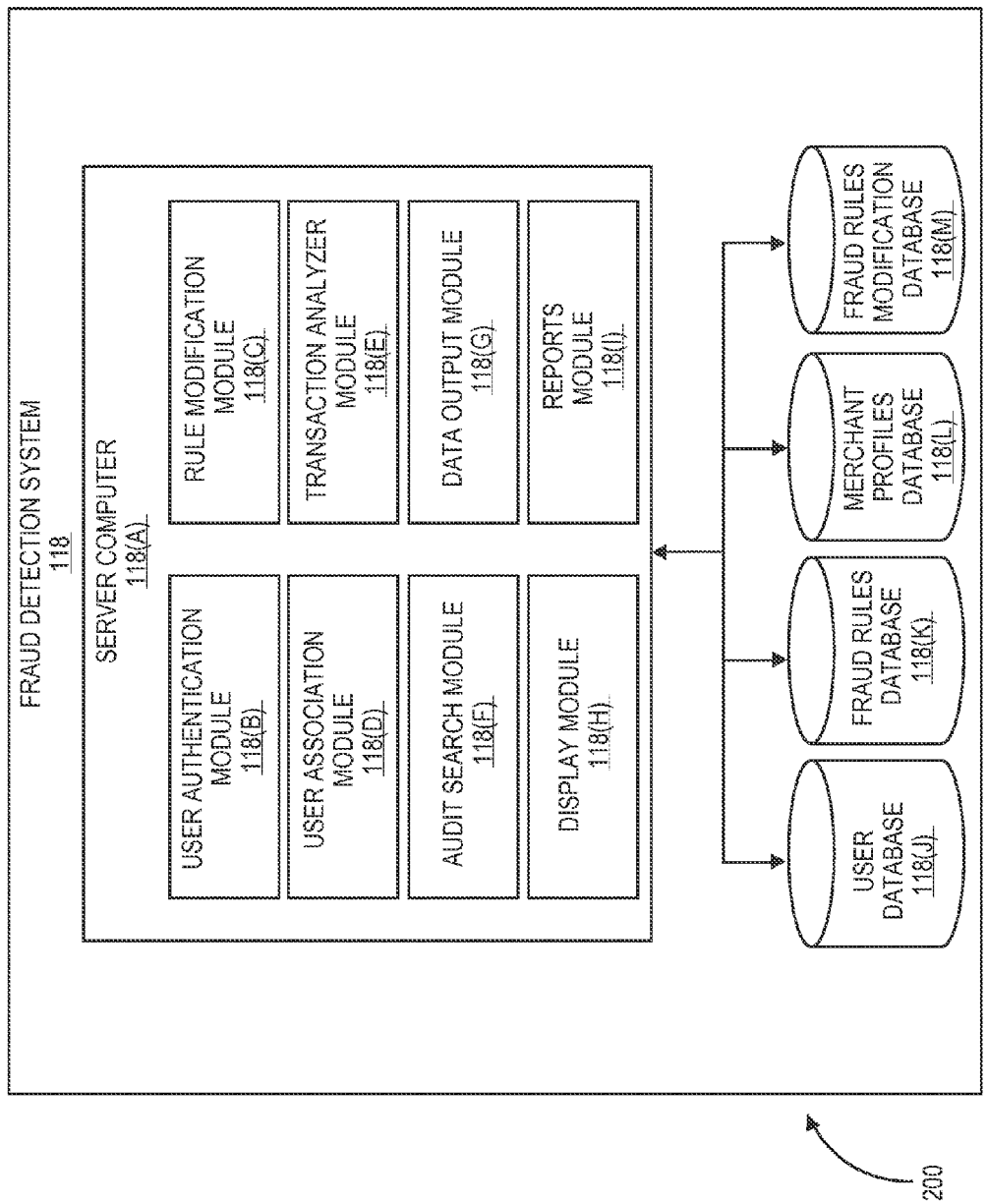
FIG. 2 shows a block diagram of components of a fraud detection system according to an embodiment of the invention.

As depicted in FIG. 2, the fraud detection system 118 may comprise a server computer 118(A) comprising a user authentication module 118(B), a rule modification module 118(C), a user association module 118(D), a transaction analyzer module 118(E), an audit search module 118(F), a data output module 118(G), a display module 118(H), and a reports module 118(I). The various modules may be embodied by computer code, residing on computer readable media.

The server computer 118(A) may be operatively coupled to one or more databases. The one or more databases may comprise a user database 118(J), a fraud rules database 118(K), a merchant profiles database 118(L) and a fraud rules modification database 118(M).

The user authentication module 118(B) handles the verification of the authorization credentials for a user (e.g. merchant ID, user name, password). The user authentication module 118(B) may access a user database 118(J) in determining whether a user 112 seeking access to the fraud detection system 118 is an authorized user. For example, when presented with credentials, the user authentication module 118(B) may access the user database 118(J) to determine whether the provided user name is in the user database 118(J) and whether the provided password corresponds to the password linked to the user name.

The rule modification module 118(C) receives modifications from a user 112 to fraud detection rules or to a merchant profile. The rule modification module 118(C) may further access the merchant profiles database 118(L) to store modifications made to a merchant profile. For example, when a user 112 makes a modification, the rule modification module 118(C) may access a merchant profile database 118(L) associated with the authorization credentials entered by the user 112. The rule modification module 118(C) may also access the fraud rules database 118(K) to access pre-established fraud detection rules to add to the merchant profile or to store newly created fraud detection rules created by the user for the merchant profile. In some embodiments of the invention, new fraud detection rules created by the user are stored in the merchant profiles database 118(L) with the corresponding merchant profile.

The user association module 118(D) may associate any modifications made by a user 112 with the authorization credentials entered by the user 112. For example, if the user 112 logged into the fraud detection system 118 with the user name "user1," the user association module 118(D) may record all the modifications made by the user 112, associate the modifications with the user name "user1," and store the data in the fraud rules modification database 118(M).

The transaction analyzer module 118(E) may evaluate transaction data received by the fraud detection system 118 from the merchant processor computer 120. In embodiments of the invention, the fraud detection system 118 receives the authorization response message from the merchant processor computer 120 and the message is analyzed by the transaction analyzer module 118(E). If the result from the transaction analyzer module 118(E) is an "ACCEPT", the transaction between the merchant and the consumer 102 can be completed. If the result from the transaction analyzer module 118(E) is a "REJECT", the fraud detection system 118 would return a message to be presented to the consumer 102 that the consumer 102 may be contacted if there are any issues. For example, the consumer may receive a message stating, "Thank you for your order. We will contact you if there are any issues." In embodiments of the invention, the message does not indicate that a "REJECT" was determined for the transaction as the consumer 102 may be attempting to conduct fraudulent transactions. If the result from the transaction analyzer module 118(E) is a "REVIEW", the fraud detection system 118 would "hold" the transaction until it can be further reviewed, and it is determined whether it should be accepted or rejected. In some embodiments, the fraud detection system 118 can automatically invoke a settlement upon an accept decision by the transaction analyzer module 118(E).

The audit search module 118(F) handles the audit log search function of the fraud detection system 118. The audit search module 118(F) receives input from a user 112 comprising search parameters to conduct an audit log search. The audit search module 118(F) processes the search parameters and conducts a search of the fraud rules modification database 118(L).

The data output module 118(G) outputs the results of the audit log search conducted by the audit search module 118(F) to be displayed to the user 112.

The display module 118(H) displays the layout of the fraud detection system 118. In embodiments of the invention, the fraud detection system 118 is accessed as a website over a communications medium (e.g. the Internet), via an Internet-enabled device capable of displaying HTML. Other embodiments allow the fraud detection system 118 to be displayed in other suitable manners on other suitable display devices.

The reports module 118(I) compiles the data obtained from the fraud detection system 118 from analyzing transactions. In embodiments of the invention, the reports module 118(I) can provide detailed statistics and data for the merchant on the performance of the merchant's profile and selection of fraud detection rules. For example, the reports module 118(I) can prepare a report indicating the number of times each fraud detection rule was triggered by a transaction. It can further indicate the results of analyzed transactions (e.g. accepted, rejected, or sent for further review). In embodiments of the invention, the reports module 118(I) can present the full transaction details for each transaction received by the fraud detection system 118.

The user database 118(J) may be used by the server computer 118(A) to store authentication elements for users. For example, the user database 118(J) may contain a plurality of merchant IDs and associated user names authorized to access the corresponding merchant profile stored in the merchant profiles database 118(L) in the fraud detection system 118. The user database 118(J) may further store passwords associated with each merchant ID and user name authorized to access the fraud detection system 118.

The fraud rules database 118(K) may be used by the server computer 118(A) to store fraud detection rules that can be added to merchant profiles. In embodiments, a merchant profile can be loaded with pre-existing rules contained in the fraud rules database 118(K). The fraud rules database 118(K) may further store new rules created by a user 112.

The merchant profiles database 118(L) may be used by the server computer 118(A) to store merchant profiles that are customized for each merchant that has created a profile with the fraud detection system 118. The merchant profile database 118(L) may further store fraud detection rules that have been created for a merchant and associated with a merchant profile.

The fraud rules modification database 118(M) may be used by the server computer 118(A) to store an audit log containing details regarding fraud detection rules, modifications made to the fraud detection rules, and the user name of the user 112 who made the modifications to the fraud detection rules. The data stored in the fraud rules modification database 118(M) may be stored by the rule modification module 118(C) and may be searched by the audit search module 118(F).

Returning now to FIG. 1 the user 112 can use the merchant client computer 114, which is communicatively coupled to the fraud detection system 118 via the communications medium 108 in order to access the fraud detection system 118. The merchant client computer 114 may be in any suitable form. Example of merchant client computers include any device capable of accessing the Internet, such as a personal computer, cellular or wireless phones, personal digital assistants (PDAs), tablet PCs, and handheld specialized readers. The merchant client computer 114 transmits data through the communications medium 116 to the fraud detection system 118. In some embodiments of the invention, the merchant computer 110 and the merchant client computer 114 may be a single device.

The merchant computer 110 may be comprised of various modules that may be embodied by computer code, residing on computer readable media. It may include any suitable computational apparatus operated by a merchant. Examples of merchant computers may include an access device or an internet merchant computer. The merchant computer 110 may be in any suitable form. Additional examples of merchant computers include any device capable of accessing the Internet, such as a personal computer, cellular or wireless phones, personal digital assistants (PDAs), tablet PCs, and handheld specialized readers. The merchant computer 110 transmits data through the communications medium 108 to the consumer client computer 106. The merchant computer 110 may also transmit data to a merchant processor computer 120. In embodiments of the invention, the merchant computer 110 receives transaction data from a consumer client computer 106 and transmits the transaction data to the merchant processor computer 120 for fraud evaluation and for further transaction authorization processes. The merchant computer 110 can further communicate with and/or receive input from a merchant client computer 114 operated by a user 112.

Figure 3:
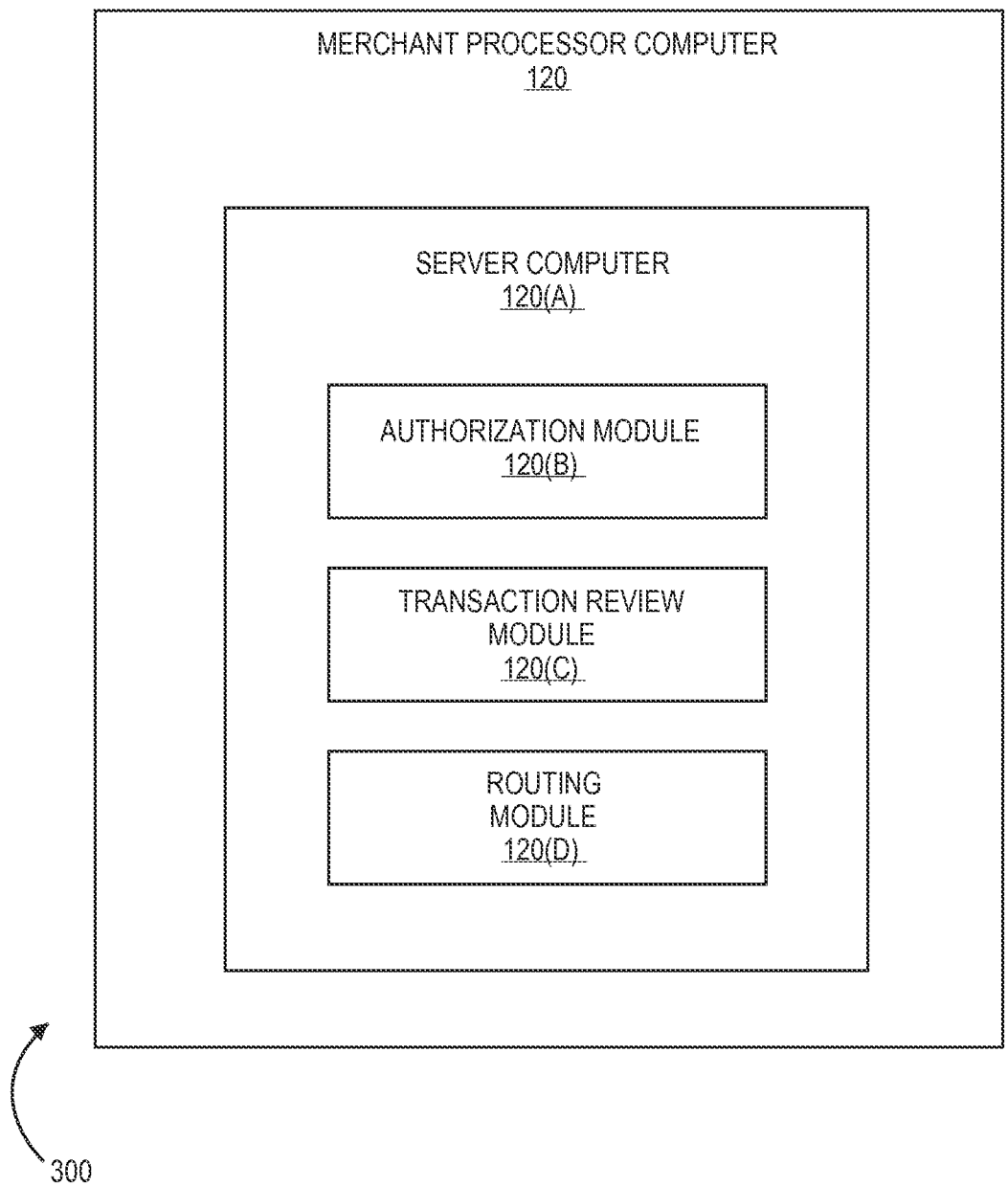
FIG. 3 shows a block diagram of components of a merchant processor computer according to an embodiment of the invention.

As depicted in FIG. 3, the merchant processor computer 120 may comprise a server computer 120(A) comprising an authorization module 120(B), a transaction review module 120(C), and a routing module 120(D). The various modules may be embodied by computer code, residing on computer readable media.

The authorization module 120(B) may generate and process authorization request and response messages. The authorization module 120(B) may also determine the appropriate destination for the authorization request and response messages. An authorization request message is a message sent requesting that an issuer computer 126 authorize a financial transaction. An authorization request message may comply with ISO 8583, which is a standard for systems that exchange electronic transactions made by consumers using payment devices. An authorization request message according to other embodiments may comply with other suitable standards. In embodiments of the invention, an authorization request message may include, among other data, a Primary Account Number (PAN) and expiration date associated with a payment device (e.g. credit/debit card) of the consumer, amount of the transaction (which may be any type and form of a medium of exchange such a money or points), and identification of a merchant (e.g. merchant ID). In embodiments, an authorization request message is generated by a server computer (if the transaction is an e-commerce transaction) or a Point of Sale (POS) device (if the transaction is a brick and mortar type transaction) and is sent to an issuer computer 126 via a payment processing network 124 and an acquirer computer 122.

The transaction review module 120(C) conducts a fraud evaluation for transactions. If the transaction review module 120(C) determines that the transaction may be fraudulent, the transaction review module 120(C) may determine that the transaction should be denied. If the transaction review module 120(C) determines that the transaction is not fraudulent, the transaction review module 120(C) may determine that the transaction should be allowed. If the transaction review module 120(C) is unable to determine whether the transaction is fraudulent, the transaction review module 120(C) can send the transaction for further review.

The routing module 120(D) can route transactions to the appropriate destination. If a transaction is determined to be not fraudulent, the routing module 120(D) can route the message to the acquirer computer 122 for further processing. If the transaction is determined to be fraudulent, the routing module 120(D) can send the transaction back to the merchant. If the fraud evaluation conducted by the transaction review module 120(C) is indeterminate, the transaction can be routed to a further review by a person.

An acquirer computer 122 is typically a system for an entity (e.g. a bank) that has a business relationship with a particular merchant or other entity. An issuer computer 126 is typically a business entity (e.g. a bank) which maintains financial accounts for the consumer 102 and often issues a consumer payment device 104 such as a credit or debit card to the consumer 102. Some entities can perform both issuer computer 126 and acquirer computer 122 functions. Embodiments of the invention encompass such single entity issuer-acquirers.

Figure 4:
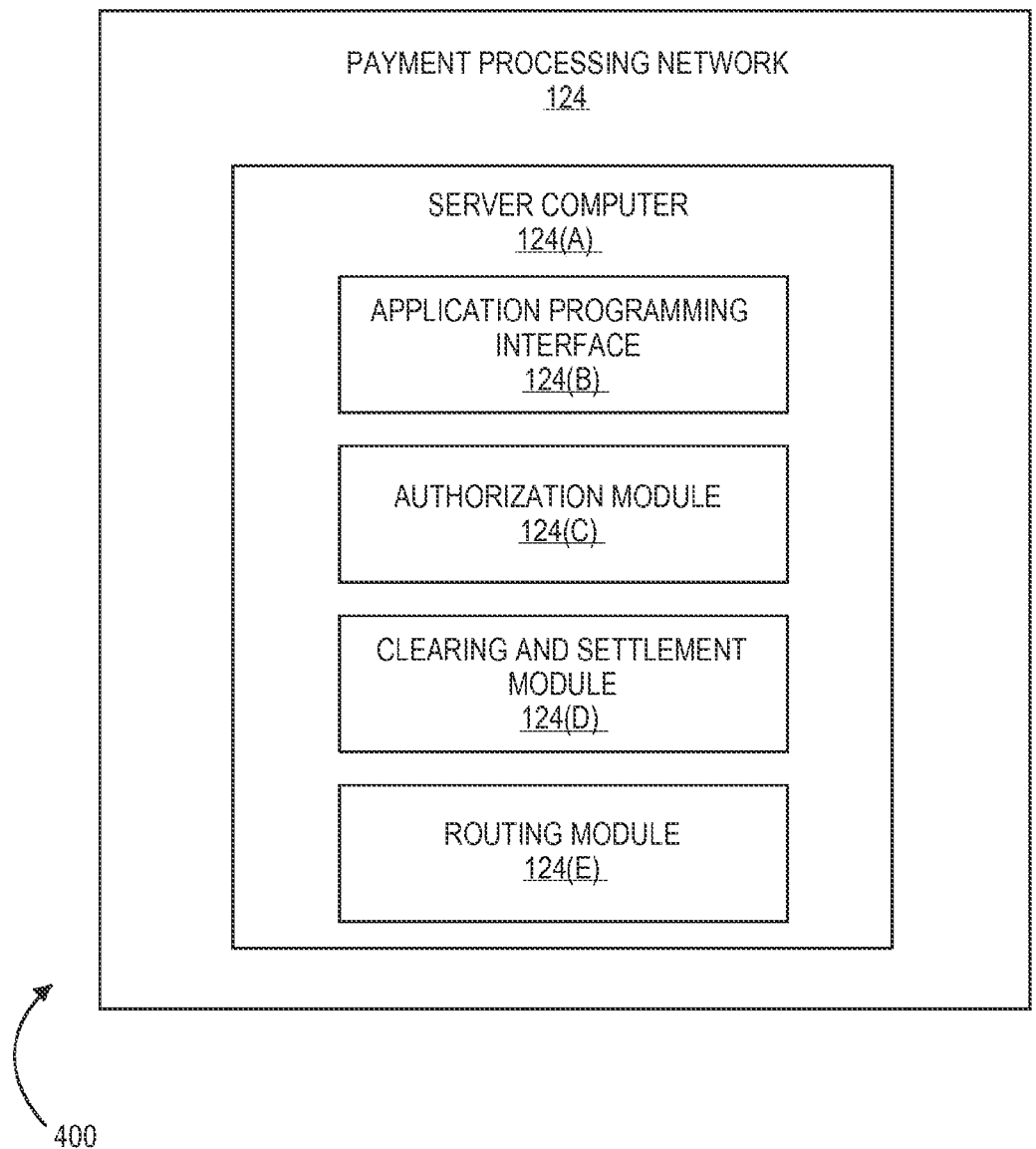
FIG. 4 shows a block diagram of components of a payment processing network according to an embodiment of the invention.

As depicted in FIG. 4, the payment processing network 124 may comprise a server computer 124(A) comprising an application programming interface 124(B), an authorization module 124(C), a clearing and settlement module 124(D), and a routing module 124(E). The various modules may be embodied by computer code, residing on computer readable media.

As noted above, the payment processing network 124 may have or operate at least a server computer 124(A). In some embodiments, the server computer 124(A) may be coupled to a database and may include any hardware, software, other logic, or combination of the preceding for servicing the requests from one or more client computers. The server computer 124(A) may comprise one or more computational apparatuses and may use any of a variety of computing structures, arrangements, and compilations for servicing the requests from one or more client computers.

The payment processing network 124 may include data processing subsystems, networks, and operations used to support and deliver authorization services, exception file services, and clearing and settlement services. An exemplary payment processing network may include VisaNet™. Networks that include VisaNet™ are able to process credit card transactions, debit card transactions, and other types of commercial transactions. VisaNet™, in particular, includes an integrated payments system (Integrated Payments system) which processes authorization requests and a Base II system which performs clearing and settlement services. The payment processing network 124 may use any suitable wired or wireless network, including the Internet.

The authorization module 124(C) processes authorization request messages and determines the appropriate destination for the authorization request messages. The clearing and settlement module 124(D) handles the clearing and settlement of transactions. These modules authenticate user information and organize the settlement process of user accounts between the acquirer computer 122 and the issuer computer 126. An example of the clearing and settlement module is Base II, which provides clearing, settlement, and other interchange-related services to VISA members.

The routing module 124(E) handles the routing of authorization request messages from the acquirer computer 122 to the issuer computer 126, and the routing the authorization response messages back from the issuer computer 126 to the acquirer computer 122.

II. Methods

Methods according to embodiments of the invention can be described with respect to FIGS. 1-6 and 8-19.

Figure 5:
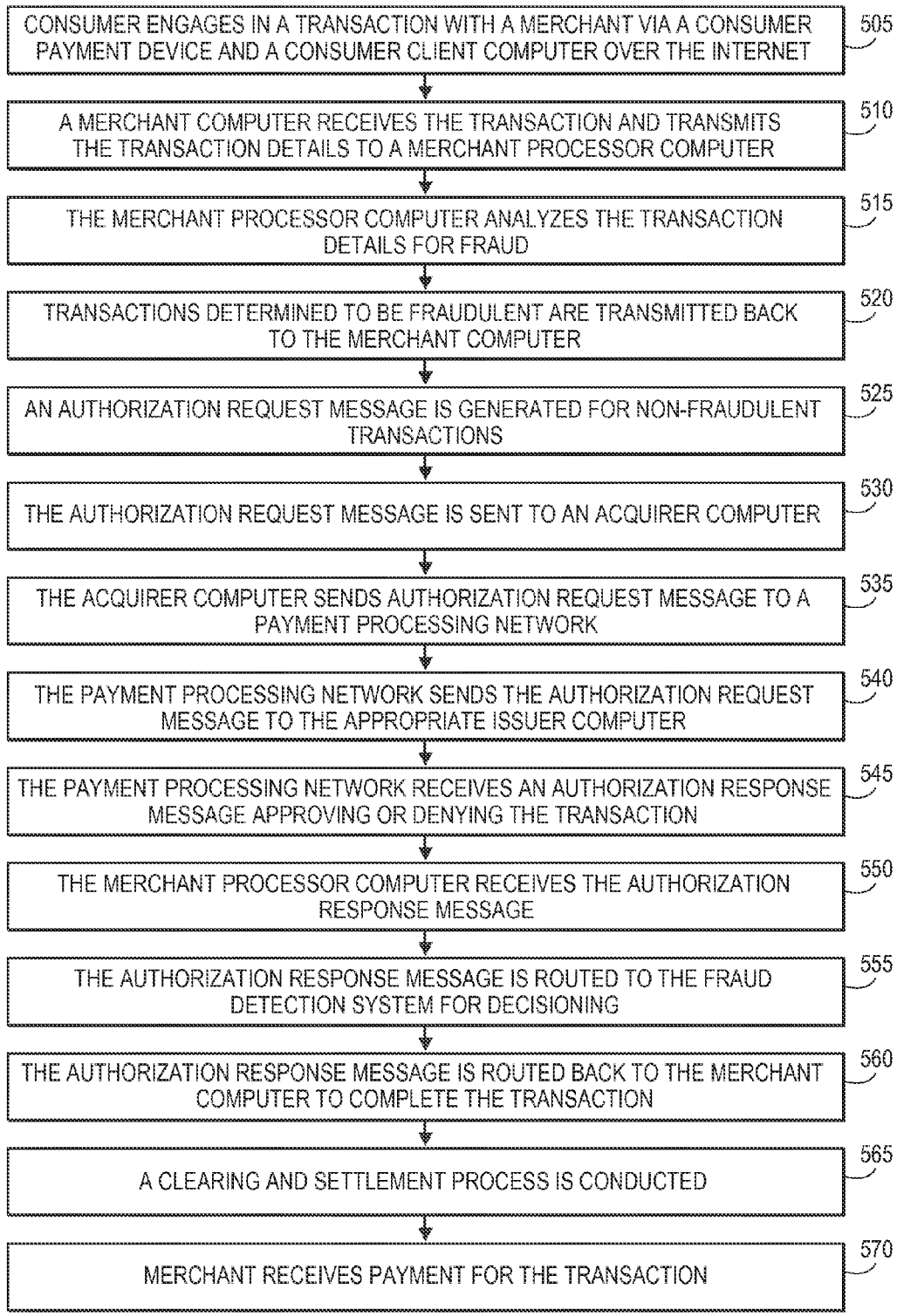
FIG. 5 illustrates a flowchart describing the process of a financial transaction according to an embodiment of the invention.

FIG. 5 is a flowchart of a method 500 for processing a transaction through a system 100 shown in FIG. 1.

In step 505, in a typical transaction, the consumer 102 engages in a transaction for goods or services at a merchant associated with a merchant computer 110 using a consumer client computer 106 and a consumer payment device 104 such as a credit card or mobile phone. For example, the consumer 102 may use their Internet-enabled mobile phone to access a merchant website to conduct a transaction using their consumer payment device 104. In other embodiments, the consumer 102 may swipe the credit card through a POS terminal or, in another embodiment, may take a wireless phone and may pass it near a contactless reader in a POS terminal.

In step 510, a merchant computer 110 receives the transaction from the consumer client computer 106 and may then transmit the transaction details to a merchant processor computer 120. Transactions details may be comprised of, but is not limited to, the following: consumer name, consumer billing address, consumer shipping address, consumer phone number, consumer account number, items purchased, item prices, etc.

In step 515, the merchant processor computer 120 may conduct a fraud analysis and determine whether the transaction should proceed or whether it should be rejected and returned to the merchant computer 110. The merchant processor computer 120 may use the transaction details in determining whether the transaction may be fraudulent.

In step 520, if the merchant processor computer 120 determines that the transaction details indicate that the transaction may be fraudulent, the merchant processor computer 120 may return the transaction to the merchant computer 110 indicating that the transaction is fraudulent and should be declined.

In step 525, if the merchant processor computer 120 determines that the transaction details indicate that the transaction is not fraudulent, an authorization request message may then be generated. The authorization request message may be generated in any suitable format.

In step 530, the generated authorization request message may be transmitted by the merchant processor computer 120 to an acquirer computer 122. The authorization request message may be transmitted in any suitable format.

In step 535, after receiving the authorization request message, the authorization request message may then be transmitted to a payment processing network 124.

In step 540, after receiving the authorization request message, the payment processing network 124 may then transmit the authorization request message to an appropriate issuer computer 126 associated with the consumer payment device 104.

In step 545, the issuer computer 126 receives the authorization request message. The issuer computer 126 may then determine whether the transaction should be authorized. The issuer computer 126 transmits an authorization response message back to the payment processing network 124. The authorization response message can indicate whether or not the current transaction has been authorized or has been declined.

In step 550, the payment processing network 124 may then transmit the authorization response message back to the acquirer computer 122. The acquirer computer 122 may then transmit the response message back to the merchant processor computer 120.

In step 555, the merchant processor computer 120 may then transmit the authorization response message to a fraud detection system 118. The fraud detection system 118 may then undertake a decision process based on the authorization response message. If the result from the fraud detection system 118 is an "ACCEPT", the transaction between the merchant and the consumer 102 can be completed. If the result from the fraud detection system 118 is a "REJECT", the fraud detection system 118 would return a message to be presented to the consumer 102 that the consumer 102 may be contacted if there are any issues. For example, the consumer may receive a message stating, "Thank you for your order. We will contact you if there are any issues." In embodiments of the invention, the message does not indicate that a "REJECT" was determined for the transaction as the consumer 102 may be attempting to conduct fraudulent transactions. If the result from the fraud detection system 118 is a "REVIEW", the fraud detection system 118 would "hold" the transaction until it can be further reviewed, and it is determined whether it should be accepted or rejected.

In step 560, after the merchant computer 110 receives the authorization response message, the merchant computer 110 may then provide the authorization response message to the consumer 102. For example, the consumer 102 may be presented with a screen on the consumer client computer 106 indicating success or failure of authorization. In other embodiments, the authorization response message may be displayed by the POS terminal, or may be printed out on a receipt.

In step 565, at the end of the day or at a period determined by the merchant, a normal clearing and settlement process can be conducted. A clearing and settlement process may include a process of reconciling a transaction. A clearing process is a process of exchanging financial details between an acquirer computer 122 and an issuer computer 126 to facilitate posting to a party's account and reconciliation of the party's settlement position. Settlement involves the delivery of securities from one party to another. In some embodiments, clearing and settlement can occur simultaneously. In other embodiments, the clearing and settlement process can be conducted by the fraud detection system 118 once the fraud detection system 118 has determined that the transaction should be accepted.

In step 570, the merchant receives payment for the transaction.

Figure 6:
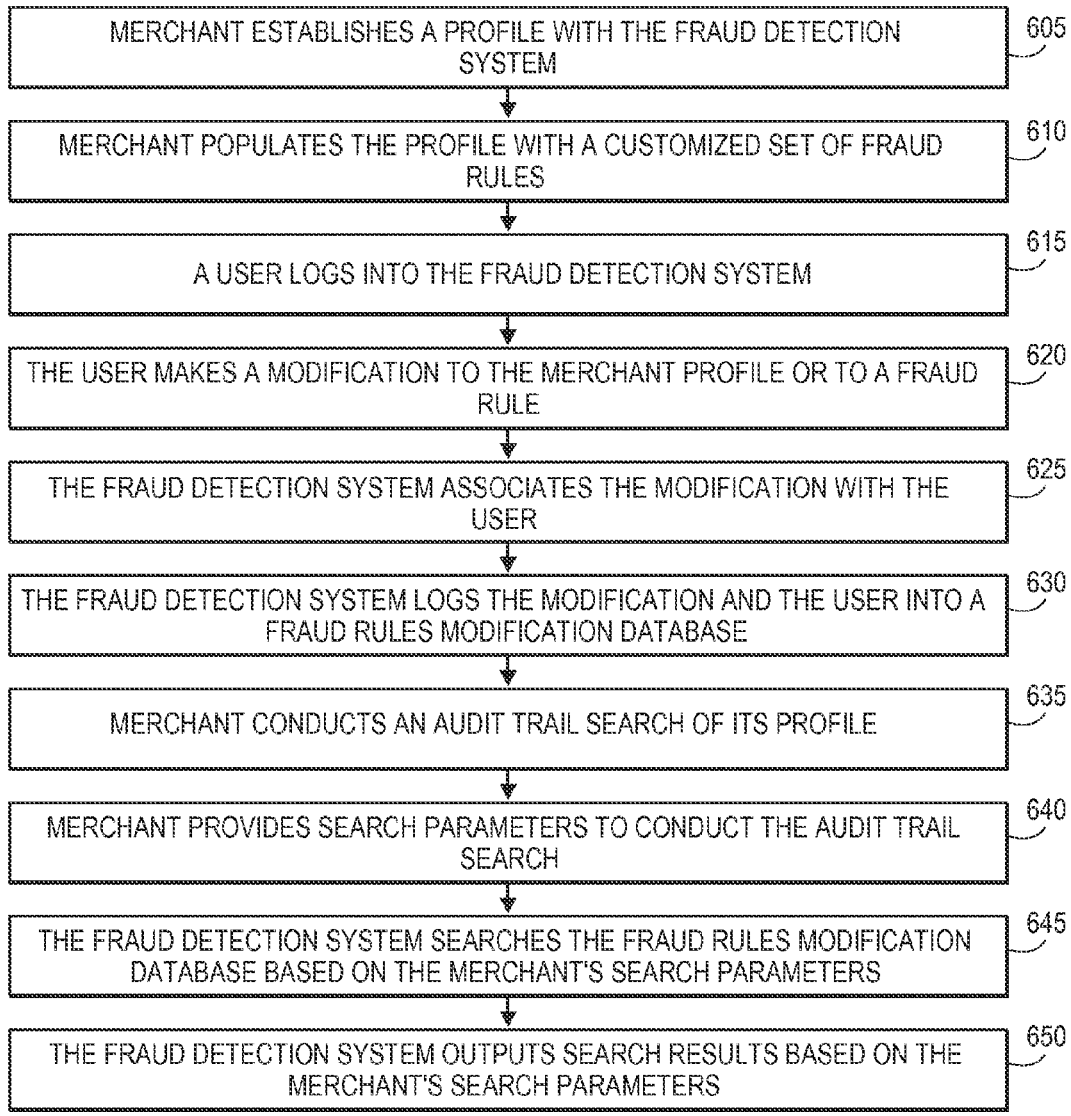
FIG. 6 illustrates a flowchart describing the operation of the system, according to an embodiment of the invention.

FIG. 6 is a flowchart of a method 600 for establishing a merchant profile, modifying fraud detection rules, and conducting an audit log search through a system shown in FIGS. 1 and 2.

In step 605, a merchant accesses the fraud detection system 118 with authorized credentials and establishes a merchant profile with the fraud detection system 118. The merchant profile is stored in a merchant profile database 118(L) and contains customized settings for the merchant profile (e.g. profile name, profile description, selected fraud detection rules, etc.). In embodiments, a merchant may establish a plurality of merchant profiles with a similar or distinct set of fraud detection rules.

In step 610, the merchant populates the merchant profile with a customized set of fraud detection rules. The merchant profile can be populated with fraud detection rules stored in a fraud rules database 118(K). In some embodiments, the merchant may create an empty merchant profile that does not contain any fraud detection rules stores in the fraud rules database 118(K). In such embodiments, the merchant can establish a completely original set of fraud detection rules based on their needs or the needs of their business. In some embodiments, the merchant can create a merchant profile with a combination of fraud detection rules stored in the fraud rules database 118(K) and merchant-created fraud detection rules. In some embodiments, the merchant-created rules may be stored in the merchant profile database 118(L). In other embodiments, the merchant-created rules may be stored in the fraud rules database 118(K). The merchant may also associated one or more users 112 with the merchant profile. The one of more users 112 may be given access to modify the selection of fraud detection rules contained in the merchant profile and/or to modify the merchant profile itself.

In step 615, a user 112 logs into the fraud detection system 118 using authorized credentials associated with the merchant and the merchant profile. In embodiments of the invention, the fraud detection system 118 authenticates the identity of the user 112 prior to permitting the user 112 to make modifications to a selection of fraud detection rules by verifying a login ID and password of the user 112. For example, the user may be the individual who established the merchant profile or an employee of the merchant who has been given access to the fraud detection system 118. The user may also be an individual who has fraudulently obtained authorized credentials in order to modify the merchant profile and fraud detection rules associated with the merchant profile in order to facilitate fraudulent activity (e.g. fraudulent transactions).

In step 620, the user 112 makes a modification to the merchant profile or makes a modification to a selection of fraud detection rules in the merchant profile using a client computer 114. For example, the user 112 may modify a fraud detection rule for transactions over $1000 that the fraud detection system 118 marks as "REVIEW", to "ACCEPT." In another example, the user 112 may add a rule that orders from a particular credit card number should be marked as "REJECT" by the fraud detection system 118. The rule modification module 118(C) records the modification in the fraud rule database 118(K) and the merchant profile database 118 (L).

In step 625, the user association module 118(D) associates the modification with the user 112 by the authorized credentials used to log into the fraud detection system 118. In embodiments of the invention, the user association module 118(D) identifies the user name used to log into the fraud detection system 118 and appends it to data indicating the fraud detection rule modified, the substance of the modification, and the date and time of the modification.

In step 630, the user association module 118(D) records the details regarding the modification to the fraud detection rule or merchant profile in an audit log in the fraud rules modification database 118(M). In embodiments of the invention, recording the details of the modification involves storing the modification and the user ID of the user 112 who made the modifications.

In step 635, the merchant logs into the fraud detection system 118 and conducts an audit log search of its profile. The merchant may conduct an audit log search regularly to monitor its merchant profile or may have been motivated by suspicious transaction activity.

In step 640, the merchant, at a merchant client computer 114, transmits the search parameters over a communications medium 116 to conduct the audit log search for modifications of its merchant profile. The search parameters are received by the fraud detection system 118 over the communications medium 116. Optional search parameters can include, but are not limited to, "Date Range," "Category," "Subcategory," "User Name," and "Keyword." FIGS. 9-13 depict exemplary audit log search screens showing optional search parameters according to embodiments of the invention.

In step 645, the audit search module 118(F) searches the fraud rules modification database 118(M) based on the merchant's search parameters. For example, the merchant can search the fraud rules modification database 118(M) for modifications made to its fraud detection rules by a specific user (e.g. an employee of the merchant with authorized credentials).

In step 650, the data output module 118(G) displays the audit log search results to the merchant showing the modifications made to the fraud detection rules. The search results received by the merchant are based on the set of search parameters. FIGS. 16-19 depict exemplary search results according to embodiments of the invention. Embodiments of the invention allow for parsing the search results for modifications to the fraud detection rules made by a specific user. For example, if the initial search was for all modifications made over a custom date range, the search results can be further narrowed by entering a string of characters as shown and described with respect to FIG. 19. Thus, the search results can be restricted to only those entries in the audit log containing desired text. For example, the scope of the search result can be narrowed to focus on only those modifications to the selection of fraud detection rules made by a specific user using a user name.

FIGS. 8-19 depicts exemplary interactive screens that are displayed by the fraud detection system 118.

Figure 8:
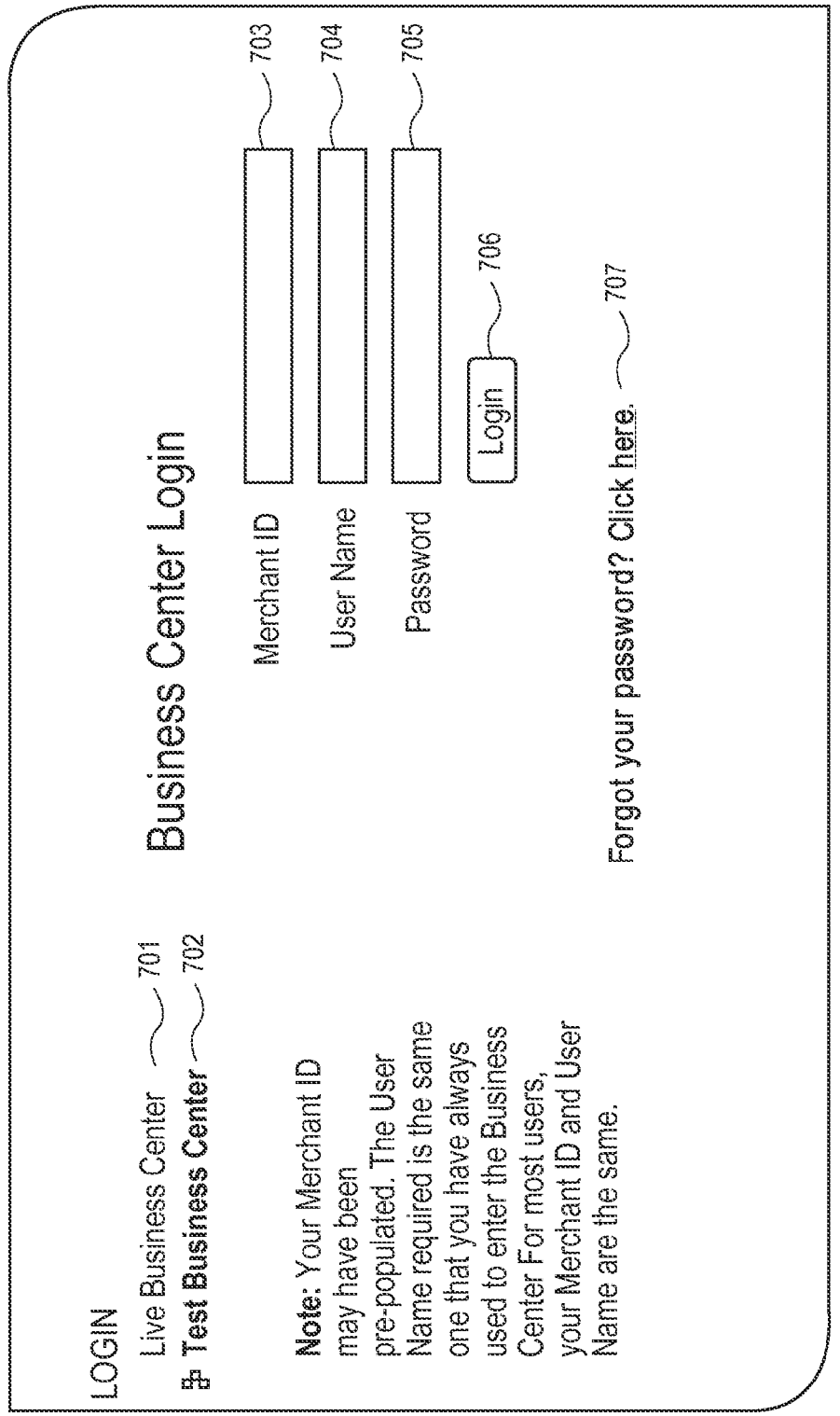
FIG. 8 shows a depiction of a user login page according to an embodiment of the invention.

FIG. 8 depicts an exemplary user login screen 700 according to an embodiment of the invention. A user 112 is provided the option of accessing either a Live Business Center 701 or accessing a Test Business Center 702. Selecting the Live Business Center 701 allows the user 112 to log into a real-time run environment where actual transactions are run through the fraud detection system 118. Selecting the Test Business Center 702 allows the user 112 to log into a test environment that the user 112 can utilize to run test or simulated transactions through the fraud detection system 118.

In order to access the fraud detection system 118, the user 112 must enter authorized credentials when prompted with the login screen 700. The authorized credentials are entered in a Merchant ID field 703, a User Name field 704, and a Password field 705. Once the fields have been filled, the user 112 can select the "Login" button 706 for the credentials to be authorized. If the user 112 has forgotten their password, the user 112 can access a password recovery process by selecting the hyperlink 707.

Figure 9:
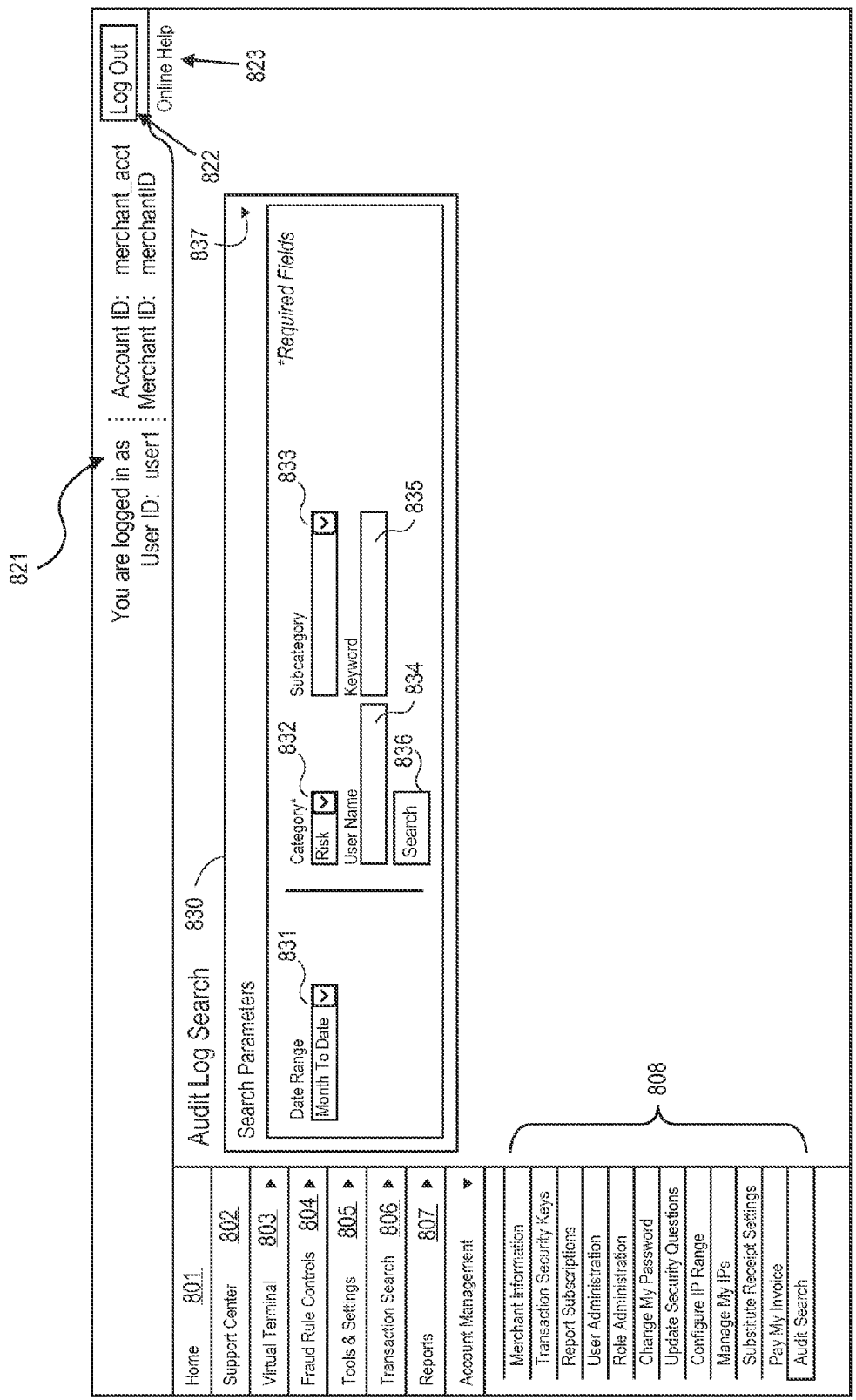
FIG. 9 shows a depiction of an audit log search page according to an embodiment of the invention.

FIG. 9 depicts the default search screen 800 when a user 112 selects the "Audit Search" option from the menu options. The left-column menu includes a selection of options for using the fraud detection system 118. Selecting the "Home" 801 option takes the user 112 to the home screen of the fraud detection system 118. Selecting the "Support Center" 802 option takes the user 112 to the Help and Support Center for the fraud detection system 118. Selecting the "Virtual Terminal" 803 option takes the user 112 to a page that the user 112 can use to simulate transactions to test the fraud detection system 118. Selecting the "Fraud Rule Controls" 804 option takes the user 112 to the fraud detection rules and merchant profile settings and controls. There the user can add, modify, or delete, fraud detection rules and/or merchant profiles. Selecting the "Tools & Settings" 805 option takes the user 112 to a variety of tools that the user 112 can use with the fraud detection system 118. Selecting the "Transaction Search" 806 option takes the user 112 to a search page that the user 112 can utilize to conduct searches for specific transactions. Selecting the "Reports" 807 option takes the user 112 to the Reports page that allows the user 112 to review different activity compiled by the fraud detection system 118 in specialized and customizable reports. Selecting the "Account Management" 808 option takes the user 112 to a variety of administrative functions including the "Audit Search" function.

Figure 10:
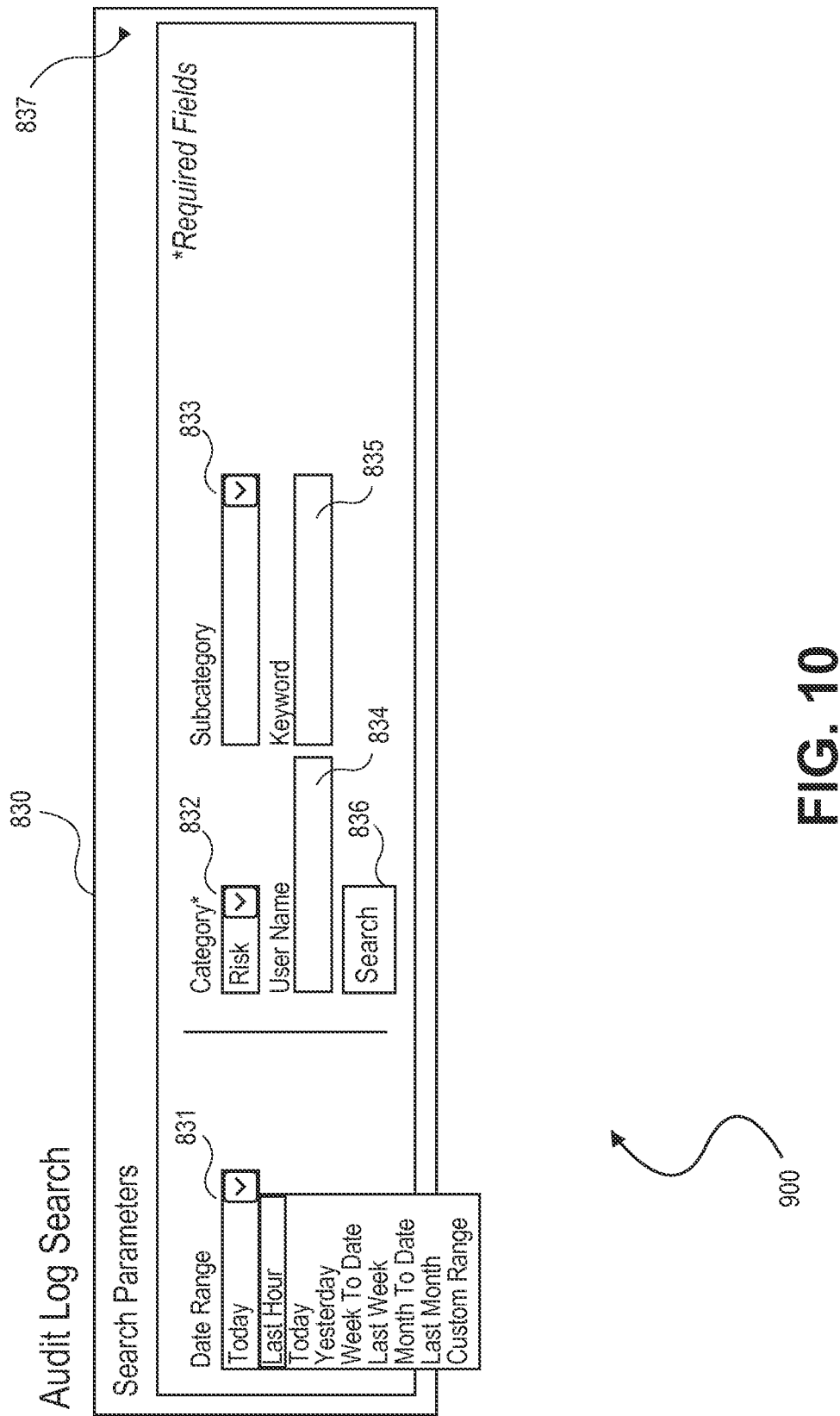
FIG. 10 shows a depiction of features of a customizable date range search parameter on an audit log search page according to an embodiment of the invention.

The search screen in FIG. 9 includes a plurality of drop-down menus and text fields in a search parameters box 830 that the user 112 can utilize to customize the audit search. Optional search parameters can include, but are not limited to, "Date Range" 831, "Category" 832, "Subcategory" 833, "User Name" 834 and "Keyword" 835. The "Date Range" 831 option allows the user 112 to select a range of time over which to conduct their search. As shown in FIG. 10, "Date Range" 831 options include, but are not limited to, "Last Hour", "Today", "Yesterday", "Week To Date", "Last Week", "Month to Date", "Last Month", and "Custom Date Range". If the user 112 selects a preset time interval, the search results include transactions requested from midnight on the start date to 11:59 P.M. on the end date.

Figure 11:
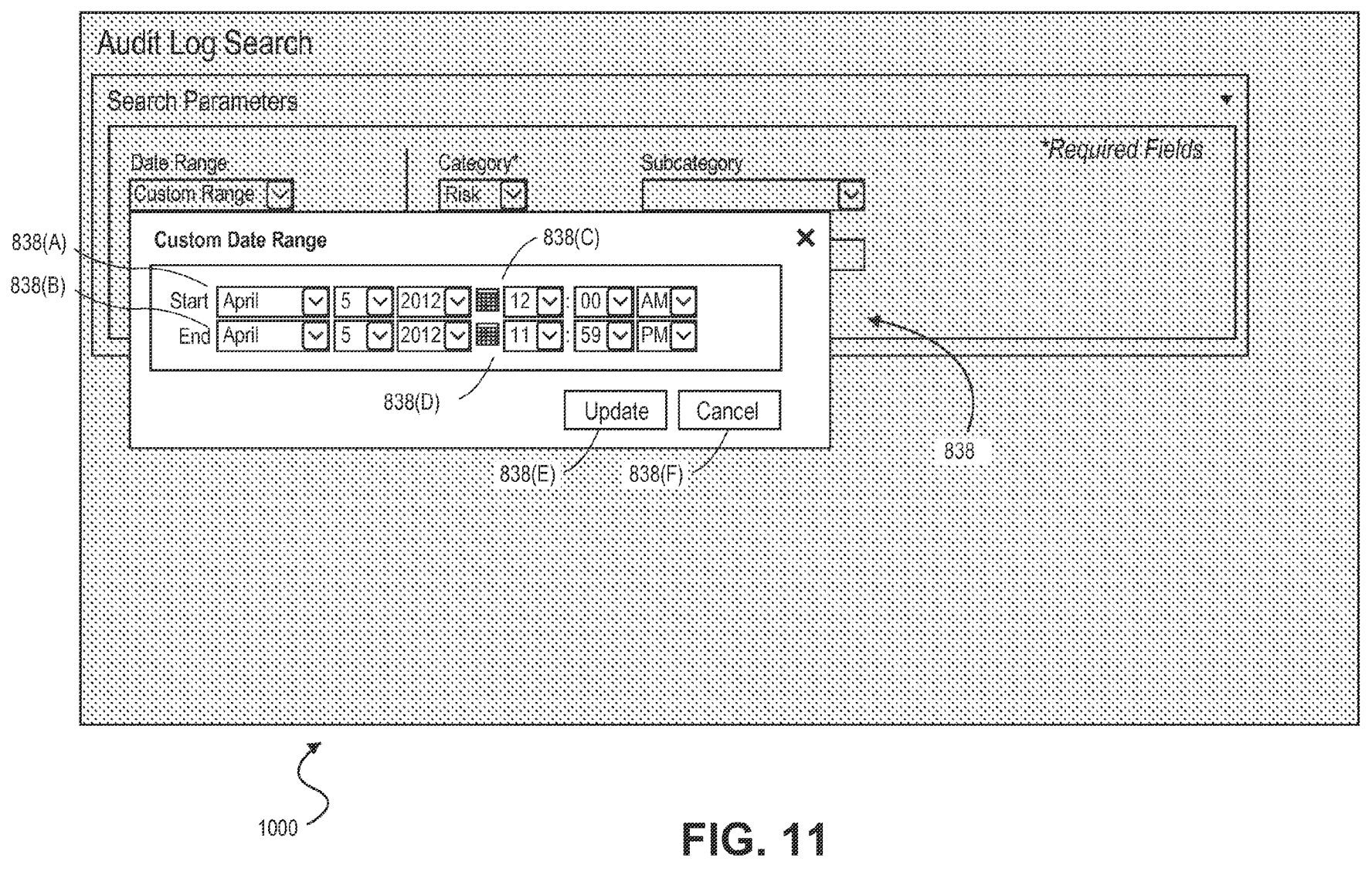

When the user 112 selects "Custom Range" from the Date Range 831 search parameter, as depicted in FIG. 11, a pop-up "Custom Data Range" window 838 appears that allows the user 112 to select the range for their search. The user 112 can select a start month, day, year, and time 838(A), and an end month, day, year, and time 838(B). In embodiments of the claimed invention, the custom date range extends to a limit of six months prior to the current date. In other embodiments, the time span for the search can be greater than six months. In yet other embodiments, custom ranges are possible only for a maximum of 31 days within the previous six months. Alternatively, the user 112 can select the calendar icons 838(C) and 838(D) in between the year drop-down option and the hour drop-down option. Selecting calendar icons 838(C) and 838 (D) results in a calendar month to appear as a pop-up for the user 112 to pick a specific date. The "Update" button 838(E) allows the user 112 to update the custom date range and the "Cancel" button 838(F) allows the user 112 to cancel updating the custom date range. FIG. 12 depicts the search screen once the user 112 has set a custom range for the search. In the example, the user has customized their search to search for changes to rules made between Apr. 1, 2012 at 12:00 A.M. and Apr. 15, 2012 at 11:59 P.M.

As shown in FIG. 9, the default "Category" is "Risk". FIG. 13 depicts the list of options available to a user 112 in the "Subcategory" drop-box 833. In embodiments of the claimed invention, the option include, but are not limited to: "Profiles", "Custom Rules", "Active Profile Selector", "Passive Profile Selector", "Custom Lists", "Queues", "Velocity", "Settings", "Third Party", "Reviewer Settings", "DMH Group Activation", "DMH Group Management", and "List Management".

Searches conducted with the "Profiles" subcategory selected results in the changes, additions, settings, and deletions made to profiles to be displayed. In embodiments, the setting of a rule in a profile appears in a "Profiles" search, while changes in conditions inside the rule appear in a "Custom Rules" search. This is described in greater detail with reference to FIG. 17.

Searches conducted with the "Custom Rules" subcategory selected results in the changes, additions, settings, and deletions made to custom rules and copies made of pre-defined rules to be displayed.

Searches conducted with the "Active Profile Selector" or "Passive Profile Selector" subcategory selected results in the changes, additions, settings, and deletions made to active and passive profile selector rules to be displayed.

Searches conducted with the "Custom Lists" subcategory selected results in the changes, additions, and deletions made to custom lists to be displayed.

Searches conducted with the "Queues" subcategory selected results in the changes, settings, and deletions made to queues to be displayed.

Searches conducted with the "Velocity" subcategory selected results in the changes, additions, settings, and deletions made to product, order, and global velocity rules and settings to be displayed.

Searches conducted with the "Settings" subcategory selected results in the changes made to general Decision Manager settings to be displayed.

Searches conducted with the "Third Party" subcategory selected results in the changes, additions, and deletions made to third-party configuration settings to be displayed.

Searches conducted with the "Reviewer Settings" subcategory selected results in the changes, additions, and deletions made to reviewer settings to be displayed.

Searches conducted with the DMH Group Activation" subcategory selected results in the changes in activation and deactivation of merchants in a group of merchants to be displayed.

Searches conducted with the "DMH Group Management" subcategory selected results in the changes that affect the implementation of merchants in a group of merchants to be displayed.

Searches conducted with the "List Management" subcategory selected results in the changes, additions, conversions, and deletions made to the positive, negative, and review list to be displayed.

Returning to FIG. 9, the user 112 can optionally enter characters into the "User Name" 834 and "Keyword" 835 text fields. For the "User Name" field 834, the user 112 can enter the user name of a user 112 who may have made changes to any of the rules. In embodiments of the claimed invention, for the "Keyword" field 835, the user 112 can enter the name of the Decision Manager component or List Manager record that was added, modified, copied, or deleted. For example, if a customer rule named "Overnight Shipping" was previously established, the user 112 can use the name of the rule as a keyword. As another example, the audit log searched can be narrowed to focus on only modifications made by a particular user by entering the user name into the "User Name" text field 834.

Additional information and options displayed on the search screen 800 include the login information section 821 containing the user ID, account ID, and merchant ID. The user 112 can log out of the fraud detection system 118 by selecting the "Log Out" option 822. If the user 112 wants additional help, the user 112 can select the "Online Help" option 823. Selecting the triangle-shaped option 837 on the search parameters box 830 allows the user 112 to close or open the search parameters box 830.

Once the user 112 has selected the search parameters for their search, the user 112 selects the "Search" button 836 in order to conduct the search. Exemplary search screen resulting from conducting searches are described with reference to the following examples.

Figure 15:
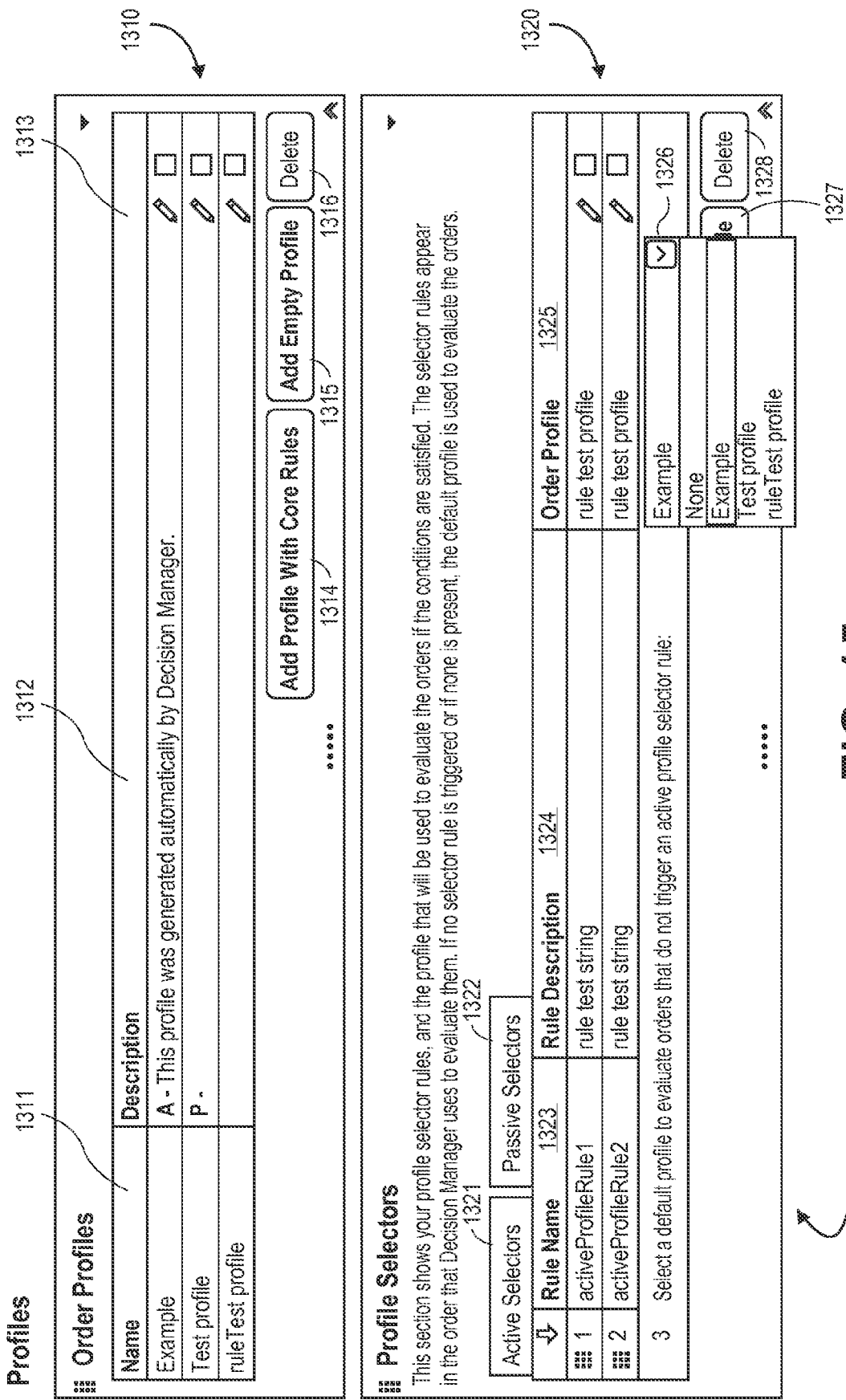
FIG. 15 shows a depiction of a Profile page showing modifications made to profile settings according to an embodiment of the invention.

FIGS. 14, 15, and 16 depict an example where a user 112 makes changes to a merchant profile and fraud detection rules and the audit search results screen showing the logged changes. In this example, the user 112 logged in has the user name "user1."

FIG. 14 depicts a screen 1300 showing the original settings that were set up in the system. In this example, the "Order Profiles" section 1310 includes a table with a Name column 1311 and a Description column 1312, and select box options 1313. The screen also provides the option of creating a new merchant profile pre-filled with core fraud detection rules by selecting the "Add Profile With Core Rules" button 1314 or creating a new merchant profile without any fraud detection rules by selecting the "Add Empty Profile" button 1315. Merchant profiles can be deleted by selecting the corresponding select box option 1313 and selecting the "Delete" button 1316. The merchant profile named "ruleTest profile" is set as default active and passive as denoted by the "A|P" shown in the Description column 1312 in the "Order Profiles" section of FIG. 14. The "Profile Selectors" section 1320 includes a table with a Rule Name column 1323, a Rule Description column 1324, and an Order Profile column 1325. The screen also provides the option of creating a new profile selector rule by selecting the "Add Selector Rule" button 1327. Profile selector rules can be deleted by selecting the corresponding select box option and selecting the "Delete" button 1328. The "Profile Selector" section 1320 of FIG. 14 shows that the "Active Selectors" tab 1321 has been selected and again shows that the merchant profile named "ruleTest profile" is the default active merchant profile in the drop-box 1326. The "Passive Selectors" tab 1322 would similarly show that the profile named "ruleTest profile" is the default passive merchant profile.

FIG. 15 shows that the merchant profile named "Example" has been set as the default active merchant profile as denoted by the "A" shown in the Description column 1312 in the "Order Profiles" section 1310. FIG. 15 also shows that the profile named "Test profile" has been set as the default passive merchant profile as denoted by the "P" shown in the Description column 1312 in the "Order Profiles" section 1310. The "Profile Selector" section 1320 of FIG. 15 shows that the "Active Selectors" tab 1321 has been selected and shows that the profile named "Example" is the default active merchant profile. The "Passive Selectors" tab 1322 would similarly show that the profile named "Test profile" is the default passive merchant profile.

FIG. 16 shows a resulting audit search results screen 1500 for a search. The search results are displayed in a chart containing in a plurality of rows, with each row made up of a plurality of columns. In embodiments, each row is a separate audit entry and is made up of seven columns. The seven columns are titled in the boxes at the top of each column. In some embodiments, the columns are titled, "Description" 1502, "Date" 1503, "Subcategory" 1504, "Merchant" 1505, "Organization" 1506, "User Name" 1507, and "Keyword" 1508. The "Description" column 1502 contains information as to what modification was made. The "Date" column 1503 contains the time at which the modification was made. The "Subcategory" column 1504 contains the subcategory in which the rule that was modified is classified under. The "Merchant" column 1505 contains the merchant id name. The "Organization" column 1506 contains the business unit or group name. The "User Name" 1507 column contains the user name of the user who made the rule modification. The "Keyword" 1508 column contains information on the modified rule or component. For example, the "Keyword" column 1508 can contain the name of the component or record that was added, modified, copied, or deleted.

In FIG. 16, the text along the top bar 1501 of the search results screen 1500 indicates search information, including start date, end date, category, and the number of audit entries found in the search. In the example in FIG. 16, the search start date is shown as Apr. 1, 2012 at 12:00 A.M., the end date is Apr. 15, 2012 at 09:15:30 A.M., the category is the default "Risk" category, and the number of audit entries found in the search was two.

Returning to the example described in FIGS. 14 and 15, the first entry in FIG. 16 shows that user1 modified the default passive merchant profile from the "ruleTest" profile to the "Test profile" profile. The entry also indicates the time at which the modification was made by user1 as being Apr. 10, 2012 at 08:53:41 AM. The second entry in FIG. 16 shows that user1 modified the default active profile from the "ruleTest" profile to the "Example" profile. The entry also indicates the time at which the modification was made by user1 as being Apr. 10, 2012 at 08:53:37 AM.

FIG. 17 depicts an exemplary audit search results screen 1600 showing two actions performed within a profile that are logged in separate subcategories: "Profiles" and "Custom Rules". As noted previously, in embodiments, the setting of a rule in a profile appears in a "Profiles" search, while changes in conditions inside the rule appear in a "Custom Rules" search. In the example shown in FIG. 17, user2 changed the "JVM Issue" rule from "Reject" to "Review" and changed the Rule Condition from "Billing city is not equal to combo2" to "Billing city is equal to Decoded IP city". As shown in FIG. 17, changing the rule from "Reject" to "Review" is categorized in the "Profiles" subcategory, while the change to the rule condition is categorized in the "Custom Rules" subcategory.

FIG. 18 depicts an exemplary audit search results screen 1700 showing the addition of a new custom rule. As shown in the search parameters along the top of the search results screen 1700, the search was conducted for audit entries from Apr. 1, 2012 at 12:00:00 A.M. to Apr. 15, 2012 at 12:00:35 P.M., and "Custom Rules" was chosen as the subcategory for limiting the search. The audit log entry shows that a custom fraud detection rule titled "Cupertino Orders" was created on Apr. 2, 2012 at 11:30:02 P.M. According to the information in the "Description" column 1702, the custom fraud detection rule relates to orders shipping to Cupertino, was placed in the category "Shipping Rules," was designated a core fraud detection rule with its core fraud detection rule decision marked as "review," and was not designated a group rule. Additionally, two rule conditions were established for "Cupertino Orders": the shipping city for the order must contain the character string "Cupertino" and the amount of the order must be greater than $500. If both of these conditions are triggered, the fraud detection rule is applied.

FIG. 19 depicts additional functionality for the audit search results screen 1800. In embodiments, the text fields located beneath the column titles and before the first audit entry can be used to narrow the search results if there is a plurality of search results. For example, typing in "cvn" in the text field 1802 in the "Description" column 1801 causes the audit search results screen 1800 to display only those entries that contain the character string "cvn." All audit entries that do not contain the character string "cvn" are removed from the table. This process can be done on any column in the audit search results screen.

III. Technical Benefits

Embodiments of the invention provide the technical benefits of efficiency and conserving resources. By establishing a merchant profile comprised of core fraud detection rules and customized fraud detection rules based on an individual merchant's business flow and transaction history, a merchant can efficiently automate a process that would otherwise require significant review by people. Further, the audit log containing modification histories increases efficiency by quickly providing merchants with information as to modifications to fraud detection rules and merchant profiles, as well as the identity of the user who made modifications. In this manner, by automating a search of fraud detection rule modifications, the merchant is saved the time and resources it would have to spend going through all its fraud detection rules to determine what changes may or may not have been made to its fraud detection rules and merchant profile.

Another technical benefit with embodiments of the claimed invention is conserving resources for transaction processing. For example, when the number or percentage of transactions that are flagged for review changes drastically (e.g., the number of transactions flagged for review goes from 10 per hour to 500 per hour), the operator of the fraud detection system can determine whether or not a change to one or more of the fraud detection rules in the merchant's profile caused the increase for the merchant. Adjustments can then be made to settings and conditions, allowing the merchant to conserve resources that would otherwise be expended processing transactions that do not require review.

Another technical benefit with embodiments of the claimed invention is that audit log searches can be conducted to find insider fraud. For example, if an employee with access to a merchant profile and the fraud detection rules within the merchant profile has changed the fraud detection rules in order to allow a co-conspirator to purchase merchandise with stolen credit card numbers, the employee's actions can be tracked.

IV. Additional Embodiments

In other embodiments of the claimed invention, when the fraud detection system processes an authorization response message and determines that the transaction should be marked as "ACCEPT," the fraud detection system can facilitate the clearing and settlement process on behalf of the merchant.

Embodiments of the claimed invention may further allow additional audit log search result layout customization. The columns as described above may be manipulated in size and order based on user preference. In additional entries within the audit log search result can be sorted in ascending or descending order based on each column. For example, if sorted by the date and time field, the entries will be sorted by date and time. If any other column is sorted, the entries are sorted alphabetically, starting with numbers following by uppercase and lowercase text.

V. Exemplary Computer Apparatuses

Figure 7:
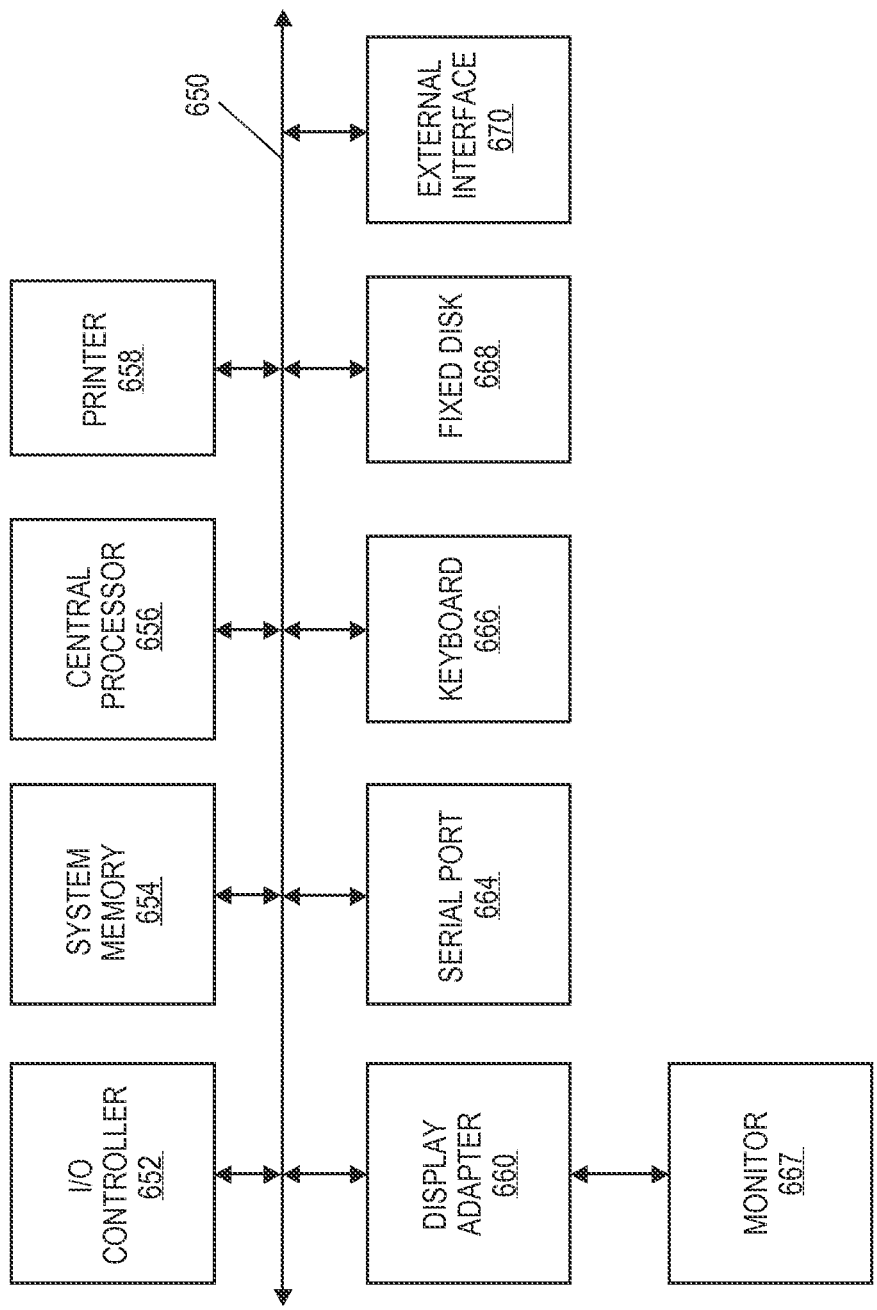
FIG. 7 shows a block diagram of a computer apparatus.

The various participants and elements may operate one or more computer apparatuses (e.g., a server computer) to facilitate the functions described herein. Any of the elements in the figures may use any suitable number of subsystems to facilitate the functions described herein. Examples of such subsystems or components are shown in FIG. 7. The subsystems shown in FIG. 7 are interconnected via a system bus 650. Additional subsystems such as a printer 658, keyboard 666, fixed disk 668 (or other memory comprising computer readable media), monitor 667, which is coupled to display adapter 660, and others are shown. Peripherals and input/output (I/O) devices, which couple to I/O controller 652, can be connected to the computer system by any number of means known in the art, such as serial port 664. For example, serial port 664 or external interface 670 can be used to connect the computer apparatus to a wide area network such as the Internet, a mouse input device, or a scanner. The interconnection via system bus 650 allows the central processor 656 to communicate with each subsystem and to control the execution of instructions from system memory 654 or the fixed disk 668, as well as the exchange of information between subsystems. The system memory 654 and/or the fixed disk 668 may embody a computer readable medium.

Further, while the present invention has been described using a particular combination of hardware and software in the form of control logic and programming code and instructions, it should be recognized that other combinations of hardware and software are also within the scope of the present invention. The present invention may be implemented only in hardware, or only in software, or using combinations thereof.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited in this patent are hereby incorporated by reference for all purposes.

One or more features from any embodiment may be combined with one or more features of any other embodiment without departing from the scope of the disclosure.

In embodiments, any of the entities described herein may be embodied by a computer that performs any or all of the functions and steps disclosed.

Any recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method comprising:
   providing, by a server computer, a user interface on a first computer for viewing and modifying a plurality of fraud detection rules for detecting fraudulent transactions;
   receiving, by the server computer, a modification to a first fraud detection rule from the plurality of fraud detection rules from a user via the user interface;
   recording, by the server computer, the modification in a database by creating a first entry for the modification, the first entry including a field indicating a user identifier associated with the user;
   subsequent to recording the modification, providing, by the server computer, the user interface on a second computer;
   receiving, by the server computer, via the user interface on the second computer, a search request for prior modifications associated with the first fraud detection rule, the search request including a search parameter corresponding to the first fraud detection rule;
   searching the database, by the server computer, for entries of the prior modifications associated with the first fraud detection rule using the search parameter; and
   returning, by the server computer, a search result to the second computer, wherein the search result includes the user identifier of the user who modified the first fraud detection rule in the first entry.

2. The method of claim 1, further comprising:
   parsing the search result for the modifications to the first fraud detection rule made by the user.

3. The method of claim 1, further comprising:
searching the database, by the server computer, for modifications to the selection of fraud detection rules made by the user.

4. The method of claim 1, wherein recording the modification in the database comprises storing the modification and the user ID of the user who made the modification.

5. The method of claim 1, further comprising:
authenticating the identity of the user prior to permitting the user to make the modification to the selection of fraud detection rules, wherein authenticating comprises verifying a login ID and password of the user.

6. The method of claim 1, further comprising:
restricting the returned search result based on text contained in a character string.

7. The method of claim 1, further comprising:
receiving, from a client computer, search parameters for searching the database.

8. A server computer comprising:
a processor; and
a non-transitory computer-readable storage medium, comprising code executable by the processor for implementing a method comprising:
providing a user interface on a first computer for viewing and modifying a plurality of fraud detection rules for detecting fraudulent transactions;
receiving a modification to a first fraud detection rule from the plurality of fraud detection rules from a user via the user interface;
recording the modification in a database by creating a first entry for the modification, the first entry including a field indicating a user identifier associated with the user;
subsequent to recording the modification, providing the user interface on a second computer;
receiving via the user interface on the second computer, a search request for prior modifications associated with the first fraud detection rule, the search request including a search parameter corresponding to the first fraud detection rule;
searching the database for entries of the prior modifications associated with the first fraud detection rule using the search parameter; and
returning a search result to the second computer, wherein the search result includes the user identifier of the user who modified the first fraud detection rule in the first entry.

9. The server computer of claim 8, wherein the method further comprises:
parsing the search result for the modifications to the first fraud detection rule made by the user.

10. The server computer of claim 8, wherein the method further comprises:
searching the database, by the server computer, for modifications to the selection of fraud detection rules made by the user.

11. The server computer of claim 8, wherein recording the modification in the database comprises storing the modification and the user ID of the user who made the modification.

12. The server computer of claim 8, wherein the method further comprises:
authenticating the identity of the user prior to permitting the user to make the modification to the selection of fraud detection rules, wherein authenticating comprises verifying a login ID and password of the user.

13. The server computer of claim 8, wherein the method further comprises:
restricting the returned search result based on text contained in a character string.

14. The server computer of claim 8, wherein the method further comprises:
receiving, from a client computer, search parameters for searching the database.

15. A method comprising:
receiving, by a client computer, a user interface for modifying and searching a plurality of fraud detection rules for detecting fraudulent transactions;
transmitting, by the client computer, to a fraud detection system via a communications network, a set of search parameters for conducting a search for modifications to the plurality of fraud detection rules in a merchant profile in a fraud rules modification database, the search parameters provided via the user interface; and
receiving, by the client computer, from the fraud detection system, a search result based on the set of search parameters, wherein the search result includes user information of a user who modified the plurality of fraud detection rules.

16. The method of claim 15, further comprising:
narrowing the scope of the search result based on modifications to the selection of fraud detection rules made by a user.

17. The method of claim 15, wherein the merchant profile is associated with one or more users who have access to modify the selection of fraud detection rules contained in the merchant profile.

18. A client computer comprising:
a processor; and
a non-transitory computer-readable storage medium, comprising code executable by the processor for implementing a method comprising:
receiving a user interface for modifying and searching a plurality of fraud detection rules for detecting fraudulent transactions;
transmitting to a fraud detection system via a communications network, a set of search parameters for conducting a search for modifications to the plurality of fraud detection rules in a merchant profile in a fraud rules modification database, the search parameters provided via the user interface; and
receiving from the fraud detection system, a search result based on the set of search parameters, wherein the search result includes user information of a user who modified the plurality of fraud detection rules.

19. The client computer of claim 18, wherein the method further comprises:
narrowing the scope of the search result based on modifications to the selection of fraud detection rules made by a user.

20. The method of claim 1, further comprising:
determining whether a change in a number of fraud events is the result of the modifications to the first fraud detection rule.

* * * * *

UNITED STATES PATENT AND TRADEMARK OFFICE
CERTIFICATE OF CORRECTION

| | | Page 1 of 1 |
|---|---|---|
| PATENT NO. | : 9,129,321 B2 | |
| APPLICATION NO. | : 13/451431 | |
| DATED | : September 8, 2015 | |
| INVENTOR(S) | : B. Scott Boding et al. | |

It is certified that error appears in the above-identified patent and that said Letters Patent is hereby corrected as shown below:

In The Claims

In Column 21, line 7, the text "the user ID" should read --the user identifier--

In Column 21, line 9, the text "authenticating the identity" should read --authenticating an identity--

In Column 21, line 59, the text "the user ID" should read --the user identifier--

In Column 21, line 62, the text "authenticating the identity" should read --authenticating an identity--

In Column 22, line 29, the text "a user." should read --the user.--

In Column 22, line 56, the text "a user." should read --the user.--

Signed and Sealed this
Fifth Day of April, 2016

Michelle K. Lee
*Director of the United States Patent and Trademark Office*